(12) United States Patent
Marutani et al.

(10) Patent No.: US 10,830,524 B2
(45) Date of Patent: Nov. 10, 2020

(54) REFRIGERATOR CONFIGURED FOR INTERACTION WITH PORTABLE INFORMATION TERMINAL

(71) Applicant: Toshiba Lifestyle Products & Services Corporation, Tokyo (JP)

(72) Inventors: Yuuki Marutani, Tokyo (JP); Kazuhiro Furuta, Tokyo (JP); Kenichi Tsukamoto, Tokyo (JP); Takuya Mashimo, Tokyo (JP); Kota Watanabe, Tokyo (JP)

(73) Assignee: Toshiba Lifestyle Products & Services Corporation, Tokyo (JP)

( * ) Notice: Subject to any disclaimer, the term of this patent is extended or adjusted under 35 U.S.C. 154(b) by 0 days.

(21) Appl. No.: 14/682,960

(22) Filed: Apr. 9, 2015

(65) Prior Publication Data

US 2015/0211783 A1 Jul. 30, 2015

Related U.S. Application Data

(63) Continuation of application No. PCT/JP2013/075707, filed on Sep. 24, 2013.

(30) Foreign Application Priority Data

Oct. 12, 2012 (JP) .................. 2012-226942
Mar. 12, 2013 (JP) .................. 2013-049071
May 31, 2013 (JP) .................. 2013-115459

(51) Int. Cl.
*F25D 23/12* (2006.01)
*F25D 23/02* (2006.01)
(Continued)

(52) U.S. Cl.
CPC ............ *F25D 23/028* (2013.01); *F25D 11/02* (2013.01); *F25D 23/02* (2013.01); *F25D 23/12* (2013.01);
(Continued)

(58) Field of Classification Search
CPC ...... F25D 23/028; F25D 29/005; F25D 23/12; F25D 2400/361; H04M 1/04
See application file for complete search history.

(56) References Cited

U.S. PATENT DOCUMENTS 4,461,398 A * 7/1984 Argy .................. F17C 3/022
                                                220/560.06
4,773,032 A   9/1988 Uehara et al.
(Continued)

FOREIGN PATENT DOCUMENTS

CN   101810057   8/2010
JP   10-174301   6/1998
(Continued)

OTHER PUBLICATIONS

Korean Office Action issued in KR 10-2015-7002713 dated Sep. 1, 2016 with English Language Translation.
(Continued)

*Primary Examiner* — Filip Zec
(74) *Attorney, Agent, or Firm* — DLA Piper LLP US

(57) ABSTRACT

A refrigerator includes a storage compartment, a door opening and closing a front opening of the storage compartment, a terminal mounting part located on a front of the door so that a portable information terminal is detachably mounted thereon, and a terminal power supply part supplying power to the portable information terminal when the portable information terminal is mounted on the terminal mounting part.

46 Claims, 29 Drawing Sheets

(51) Int. Cl.
　　　*F25D 11/02*　　　(2006.01)
　　　*F25D 29/00*　　　(2006.01)
　　　*H04M 1/04*　　　(2006.01)
(52) U.S. Cl.
　　　CPC .......... *F25D 29/00* (2013.01); *F25D 2400/36* (2013.01); *H04M 1/04* (2013.01)

(56) References Cited

U.S. PATENT DOCUMENTS

| | | | | |
|---|---|---|---|---|
| 5,018,328 | A * | 5/1991 | Cur | F16L 59/065 428/74 |
| 5,934,098 | A | 8/1999 | Lee | |
| 7,143,599 | B2 * | 12/2006 | Wo | F25D 23/02 62/259.2 |
| 7,967,404 | B2 * | 6/2011 | Oh | F25D 29/005 312/405.1 |
| 8,220,204 | B2 | 7/2012 | Lee et al. | |
| 8,276,399 | B2 * | 10/2012 | Maglinger | F25D 23/12 62/331 |
| 8,523,304 | B2 * | 9/2013 | Kim | F25D 29/005 312/405.1 |
| 2002/0115480 | A1 | 8/2002 | Huang | |
| 2003/0103023 | A1 | 6/2003 | Ootsuka et al. | |
| 2004/0216471 | A1 | 11/2004 | Kim | |
| 2005/0068019 | A1 | 3/2005 | Nakamura | |
| 2005/0097912 | A1 * | 5/2005 | Nam | F25D 29/005 62/331 |
| 2007/0086151 | A1 | 4/2007 | Oh et al. | |
| 2008/0164226 | A1 | 7/2008 | McCoy | |
| 2008/0222327 | A1 | 9/2008 | McCoy | |
| 2008/0297019 | A1 * | 12/2008 | Kim | F25D 23/02 312/405 |
| 2010/0024466 | A1 * | 2/2010 | Kwon | F25D 11/02 62/449 |
| 2012/0099255 | A1 * | 4/2012 | Lee | F25D 25/025 361/679.01 |
| 2013/0120996 | A1 * | 5/2013 | Beasley | F21V 29/004 362/249.02 |

FOREIGN PATENT DOCUMENTS

| | | |
|---|---|---|
| JP | 11-108543 | 4/1999 |
| JP | 2002-039670 | 2/2002 |
| JP | 2003-323232 | 11/2003 |
| JP | 2004-147407 | 5/2004 |
| JP | 2004-159409 | 6/2004 |
| JP | 2004-271174 | 9/2004 |
| JP | 2004-340415 | 12/2004 |
| JP | 2005-030607 | 2/2005 |
| JP | 2005-098560 | 4/2005 |
| JP | 2005-110421 | 4/2005 |
| JP | 2006-033392 | 2/2006 |
| JP | 2006-304112 | 11/2006 |
| JP | 2007-113858 | 5/2007 |
| JP | 2008-236888 | 10/2008 |
| JP | 3167101 U | 4/2011 |
| JP | 2011-097770 | 5/2011 |
| JP | 3169204 U | 7/2011 |
| KR | 10-2004-0080058 | 9/2004 |
| KR | 10-2005-0044169 | 5/2005 |
| KR | 10-2012-0015249 | 4/2007 |
| KR | 10-2010-0027938 | 3/2010 |
| WO | WO 2005/047786 | 5/2005 |
| WO | WO 2008/086145 | 7/2008 |
| WO | WO 2012/132929 | 10/2012 |

OTHER PUBLICATIONS

Chinese Office Action issued in CN 201380052545.0 dated Jul. 21, 2016 with English Language Translation.
English Language Abstract and Machine Translation of KR 10-2010-0027938 published on Mar. 11, 2010, 2008.
Extended European Search Report dated Jun. 7, 2016 issued in EP Application No. 13844991.3.
Notification of Reasons for Refusal (with English translation) issued in JP Application No. 2013-115459 dated Oct. 4, 2016.
English Language Abstract and Machine Translation of JP 2005-030607 published on Feb. 3, 2005.
English Language Abstract of JP 2002-039670 published on Feb. 6, 2002.
English Language Abstract and Machine Translation of JP 2005-098560 published on Apr. 11, 2005.
English Language Abstract and Machine Translation of JP 2004-271174 published on Sep. 30, 2004.
English Language Abstract and Machine Translation of JP 2006-033392 published on Feb. 2, 2006.
English Language Abstract of JP 3169204U published on Jul. 21, 2011.
English Language Abstract and Machine Translation of JP 2003-323232 published Nov. 14, 2003.
English Language Abstract and Machine Translation of JP 2004-340415 published on Dec. 2, 2004.
English Language Abstract of JP 3167101 U published on Apr. 7, 2011.
English Language Abstract and Machine Translation of JP 2004-147407 May 20, 2004.
English Language Abstract and Machine Translation of JP 2006-304112 published on Nov. 2, 2008.
English Language Abstract and Machine Translation of JP 2004-159409 published on Jun. 3, 2004.
English Language Abstract and Machine Translation of JP 10-174301 published on Jun. 26, 1998.
English Language Abstract and Machine Translation of JP 11-108543 published on Apr. 23, 1999.
English Language Abstract and Machine Translation of JP 2008-236888 published on Oct. 21, 2008.
English Language Abstract and Machine Translation of JP 2005-110421 published on Apr. 21, 2005.
English Language Abstract of JP 2011-097770 published on May 12, 2011.
English Translation of International Search Report issued in PCT/JP2013/075707 dated Dec. 17, 2013.
International Preliminary Report on Patentability and Written Opinion issued in PCT/JP2013/075707 dated Apr. 14, 2015.
Korean Office Action issued in KR 10-2015-7002713 dated Jan. 26, 2016 with English Language Translation.
Chinese Office Action issued in CN 201380052545.0 dated Jan. 21, 2016 with English Language Translation.
Taiwanese Office Action issued in TW 102135460 dated Mar. 10, 2016 with English Language Translation.
Korean Office Action (with English Translation) issued in KR 10-2015-7002713 dated Apr. 6, 2017.
Notification of Reasons for Refusal (with English translation) issued in TW Application No. 102135460 dated Oct. 28, 2016.
European Office Action issued in EP Application No. 13844991.3 dated Jul. 4, 2017.
Chinese Office Action in CN Application No. 201710195237.3 dated Mar. 26, 2019.
Korean Office Action issued in KR Application No. 10-2017-7011740 dated Apr. 19, 2019.
Chinese Office Action in CN Application No. 201710195299 dated Apr. 24, 2019.
Japanese Office Action in JP Application 2017-59022 dated Jul. 16, 2019.
Korean Office Action in KR 10-2017-7011740 dated Oct. 21, 2019.
Japanese Office Action is JP Application No. 2018-169706 dated Mar. 17, 2020.
Chinese Office Action in CN Application No. 201710195229 dated Dec. 27, 2019.
Chinese Office Action in CN Application No. 201710195346 dated Jan. 7, 2020.
Korean Office Action issued in KR Application No. 10-2020-7001151 dated Feb. 20, 2020.
Chinese Office Action is CN Application No. 201710195170, dated Jun. 16, 2020.

(56) References Cited

OTHER PUBLICATIONS

Chinese Office Action is CN Application No. 201710195232, dated May 26, 2020.
Chinese Office Action is CN Application No. 201710195346.5, dated May 26, 2020.
Chinese Office Action is CN Application No. 201710195299.4 dated Jul. 6, 2020.

* cited by examiner

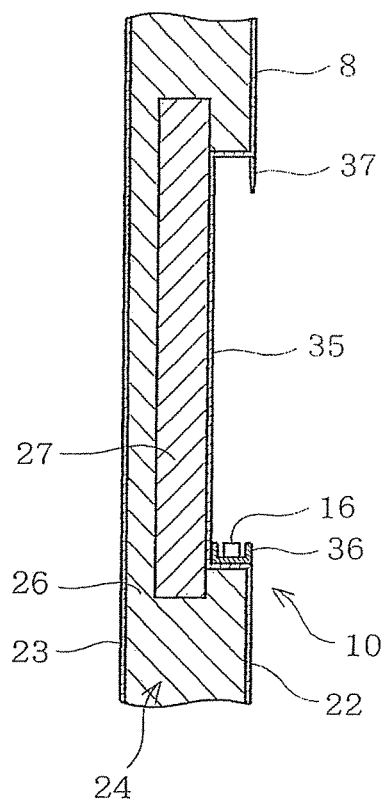
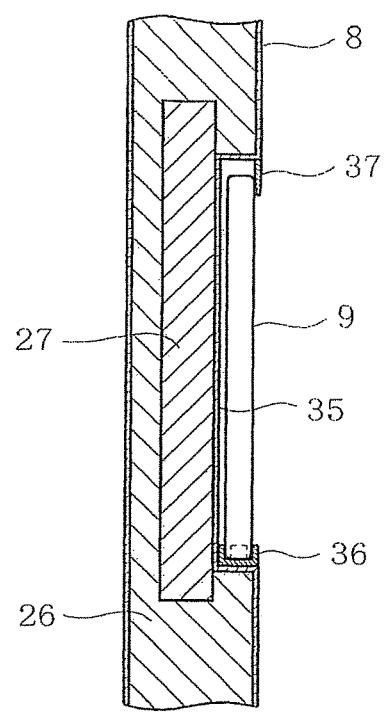
FIG.13A  FIG.13B
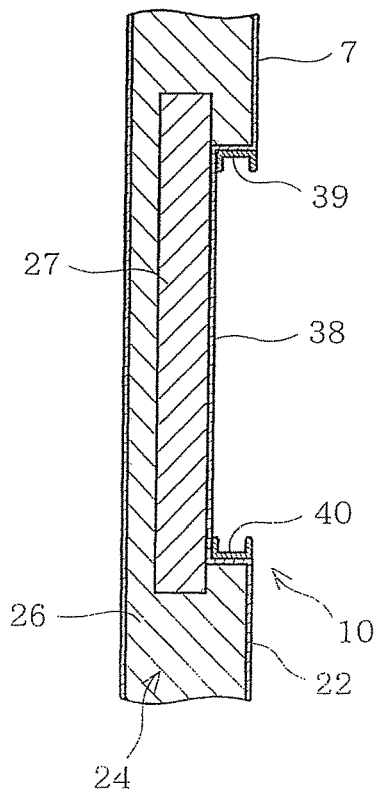
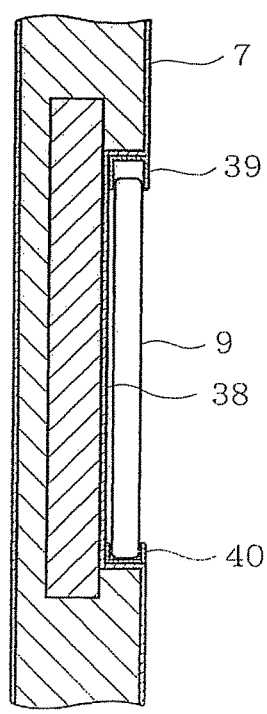
FIG.14A  FIG.14B

FIG.18
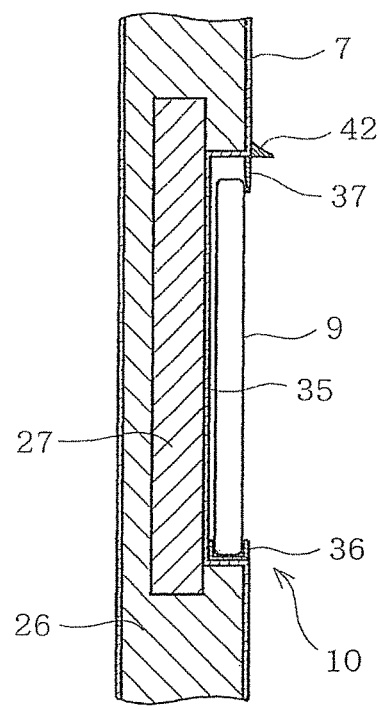
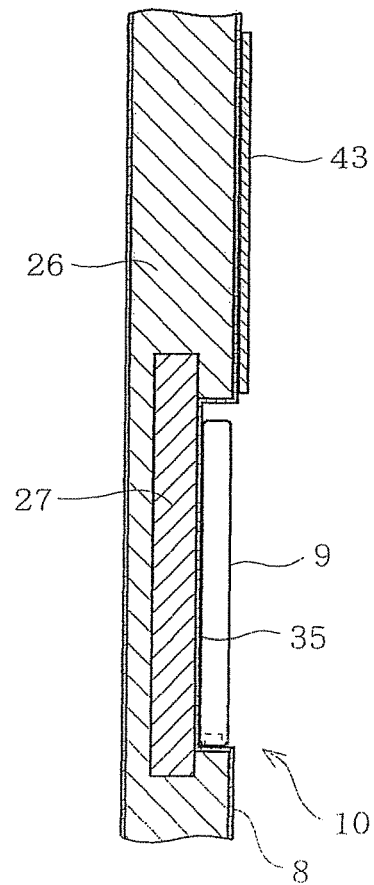
FIG.19A
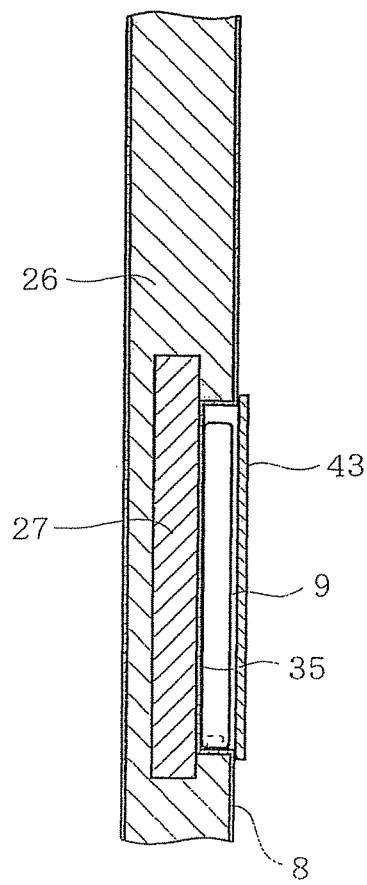
FIG.19B

REFRIGERATOR CONFIGURED FOR INTERACTION WITH PORTABLE INFORMATION TERMINAL

CROSS-REFERENCE TO RELATED APPLICATIONS

This application is based upon and claims the benefit of priority from the prior Japanese Patent Application Nos. 2012-226942 filed on Oct. 12, 2012, 2013-049071 filed on Mar. 12, 2013 and 2013-115459 filed on May 31, 2013, and the prior PCT International Application No. PCT/JP2013/75707 filed on Sep. 24, 2013, the entire contents of all of which are incorporated herein by reference.

FIELD

Embodiments herein described relate to a refrigerator.

BACKGROUND

There has conventionally been proposed a refrigerator utilizing information technology (hereinafter, referred to as "IT"), for example, a refrigerator configured to manage a situation regarding goods stored therein to utilize results of management for selection of foodstuffs in a list of foodstuffs to be purchased, selection of cooking menu or cooking recipe. Utilization of IT in this type of refrigerator requires a tablet personal computer or a portable information terminal such as smartphone for information management.

However, although many types of portable information terminals are placed on a desk or the like in use, there is a problem that a kitchen has few places on which the portable information terminal is placed when the portable information terminal is used in the kitchen. Accordingly, the portable information terminals are sometimes placed on a sink cabinet. In this case, the portable information terminal becomes wet or a screen of the portable information terminal is hard to view.

BRIEF DESCRIPTION OF THE DRAWINGS

FIGS. 13A and 13B are views similar to FIGS. 8A and 8B respectively, showing a sixth embodiment;

FIGS. 14A and 14B are views similar to FIGS. 13A and 13B respectively, showing a seventh embodiment;

FIG. 18 is a partially longitudinal section of the terminal mounting part of the refrigerating compartment door and the portable information terminal mounted on the terminal mounting part;

FIGS. 19A and 19B are partially longitudinal sections of the terminal mounting part and the portable information terminal mounted on the terminal mounting part without the cover and with the cover covering the terminal mounting part, showing a tenth embodiment, respectively;

DETAILED DESCRIPTION

In general, according to one embodiment, a refrigerator includes a storage compartment and a door opening and closing a front opening of the storage compartment. The refrigerator further includes a terminal mounting part provided on a front of the door so that a portable information terminal is detachably mounted thereon and a terminal power supply part supplying power to the portable information terminal when the portable information terminal is mounted on the terminal mounting part.

A plurality of embodiments of the refrigerator will be described with reference to the drawings. Identical or similar parts are labeled by the same reference symbols throughout the embodiments.

First Embodiment

Figure 1:
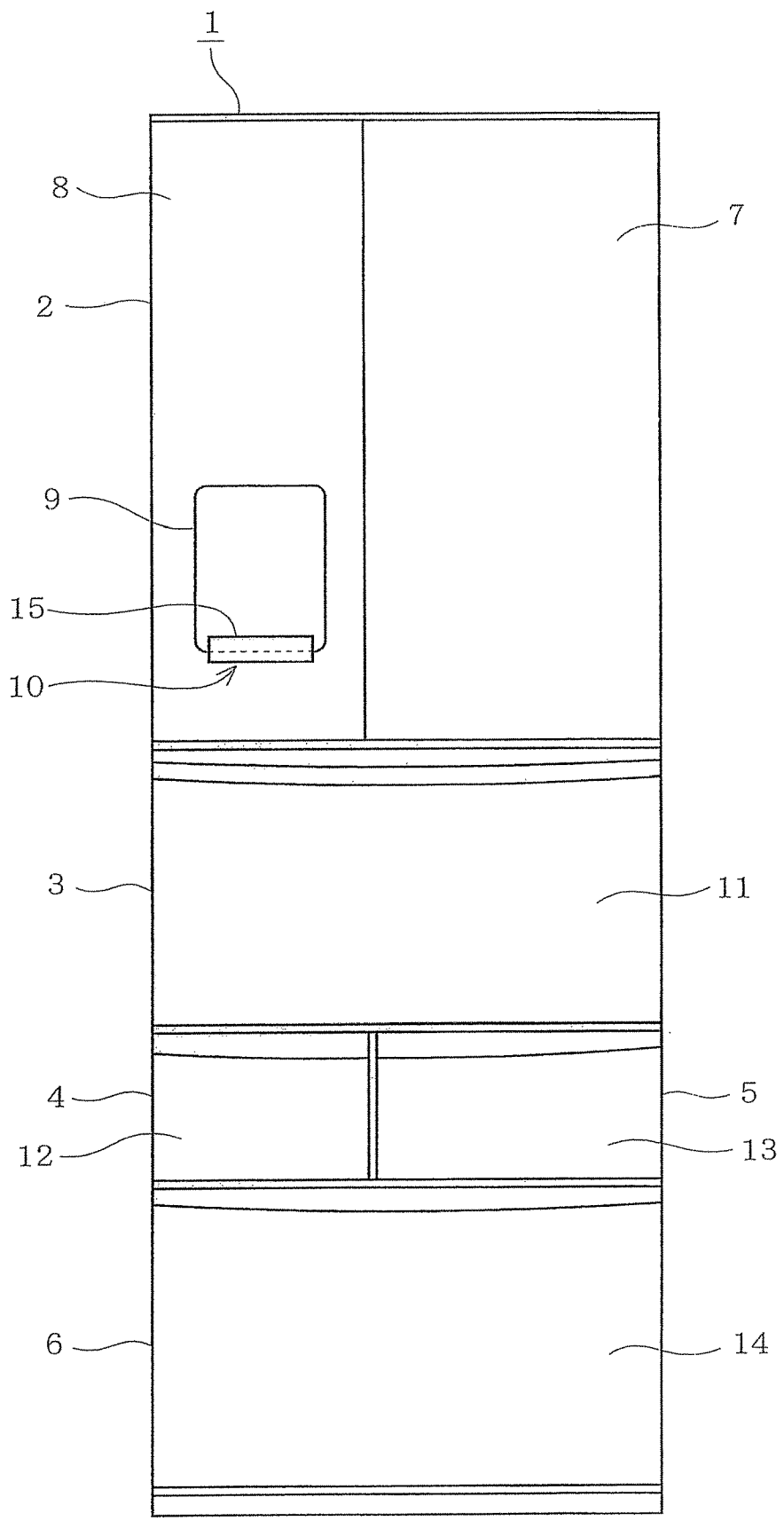
FIG. 1 is a front view of a refrigerator according to a first embodiment.
Figure 2:
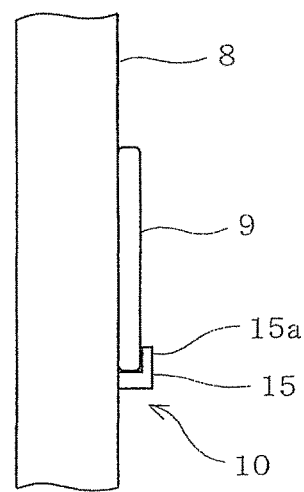
FIG. 2 is a partial side view of a refrigerating compartment door and a portable information terminal.
Figure 3:
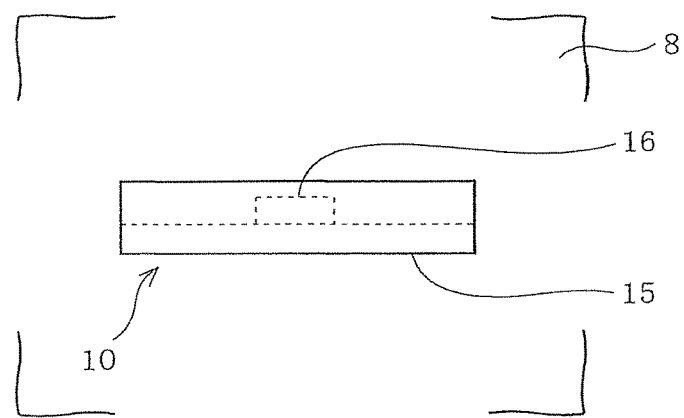
FIG. 3 is a partial front view of a terminal mounting part and its periphery.
Figure 4:
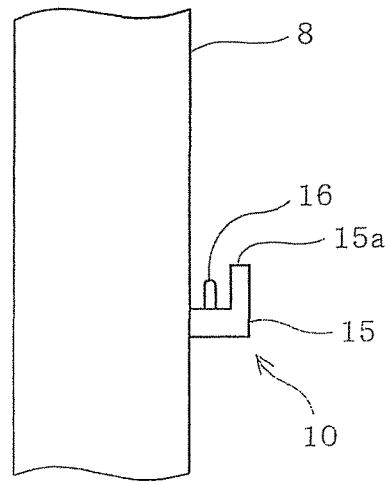
FIG. 4 is a partial side view of the refrigerating compartment door.

Referring first to FIG. 1, the refrigerator according to a first embodiment is shown. The refrigerator includes a body 1 constructed of a heat insulation box and having an interior formed into a refrigerating compartment 2, a vegetable compartment 3, an ice-making compartment 4 and a small freezing compartment 5 arranged sideways, and a freezing compartment 6 in this sequence from the top. An automatic ice-making device (not shown) is provided in the ice-making compartment 4.

The refrigerating compartment 6 has a front on which refrigerating compartment doors 7 and 8 are hingedly mounted so as to be opened and closed (biparting type). The right refrigerating compartment door 7 has a larger horizontal width than the left refrigerating compartment door 8. More specifically, the right refrigerating compartment door 7 has a larger area than the left refrigerating compartment door 8. The left refrigerating compartment door 8 has a front provided with a terminal mounting part 10 on which a portable information terminal 9 comprising a tablet PC or a smartphone is detachably mounted. The terminal mounting part 10 will be described later. An operation panel (not shown) is mounted on the front of the refrigerating compartment door 7 or 8. The operation panel includes an operation part on which various settings and selection are carried out and a plurality of display parts displaying necessary information.

A vegetable compartment 11 has a front on which a drawer type vegetable compartment door 11 is mounted. A storage container (not shown) for storing fruit and vegetables as food is mounted on a back side or inside of the vegetable compartment door 11. The refrigerating compartment 2 and the vegetable compartment 3 belong to a refrigerating temperature zone, and a maintained temperature of the refrigerating compartment 2 is set to a range between 1° C. and 5° C. and a maintained temperature of the vegetable compartment 3 is set to a range between 2° C. and 6° C., which range is slightly higher than the maintained temperature of the refrigerating compartment 2. A meat compartment (not shown) for storing meat and fish is provided in a right interior area of the refrigerating compartment 2 located in the rear of the refrigerating compartment door 7. The meat compartment belongs to a temperature range between 0° C. and 1° C., in which range food is not frozen. An egg case (not shown) for storing eggs is also provided in the right interior area of the refrigerating compartment 2.

The ice-making compartment 4, the small freezing compartment 5 and the freezing compartment 6 belong to a freezing temperature zone, for example, a negative temperature range between −10° C. and −20° C. The ice-making compartment 4 has a front on which a drawer type ice-making compartment door 12 is mounted. An ice storage container (not shown) is connected to the ice-making compartment door 12. The small freezing compartment 5 also has a front on which a drawer type small freezing compartment door 13 is mounted. A storage container (not shown) is connected to the small freezing compartment door 13. Further, the freezing compartment 6 also has a front on which a drawer type freezing compartment door 14 is mounted. A storage container (not shown) is connected to the freezing compartment door 14.

The terminal mounting part 10 will be described with reference to FIGS. 2 to 5. The terminal mounting part 10 is configured of a support member 15 (a fitting support part) having an L-shaped section. The support member 15 is mounted to the lower front surface of the refrigerating compartment door 8 by, for example, screw clamp, adhesive agent or the like. The support member 15 has a power-supply connecting terminal 16 (a terminal power supply part) provided on a central part of the bottom thereof. The power-supply connecting terminal 16 is configured of a dock connector, for example. A cable 16a (a charging power supply cable) connected to the power-supply connecting terminal 16 is buried in the refrigerating compartment door 8 and further connected to a power-supply circuit (not shown) provided in the body 1 of the refrigerator.

Figure 5A:
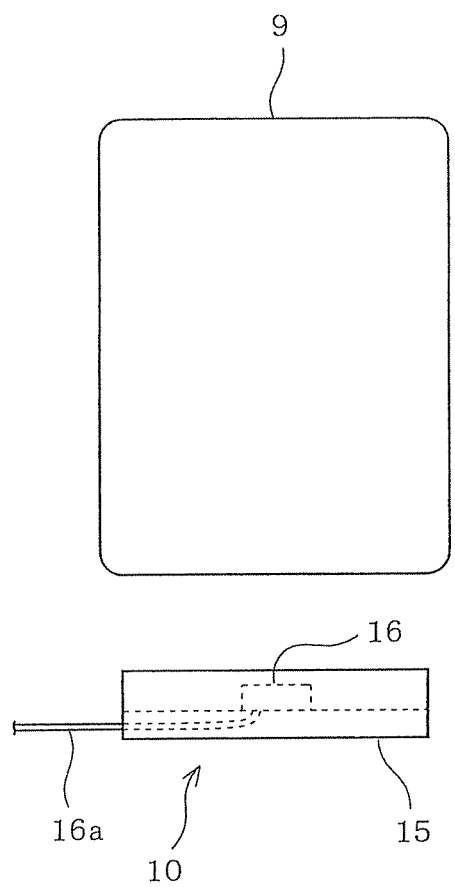
FIGS. 5A and 5B are front views of the terminal mounting part and the portable information terminal before and after the mounting of the portable information terminal, respectively.
Figure 5B:
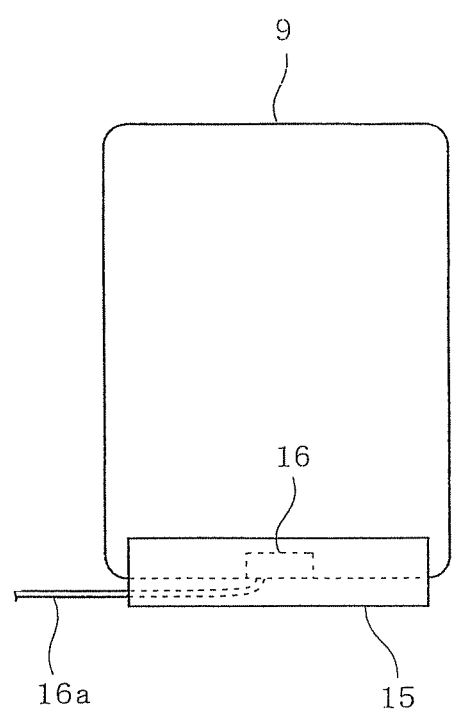
Figure 6:
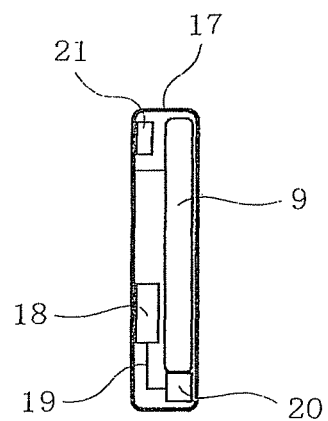
FIG. 6 is a longitudinal section of a terminal charging cover enclosing the portable information terminal in a second embodiment.
Figure 7:
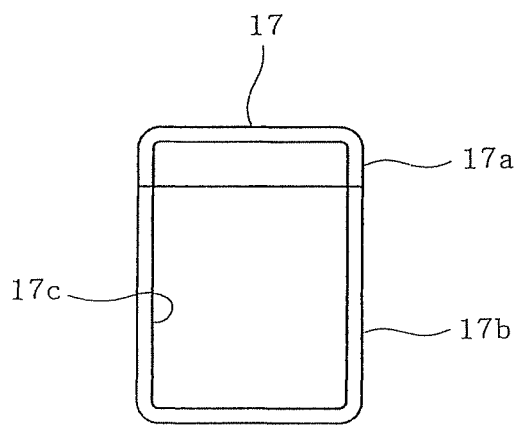
FIG. 7 is a front view of the terminal charging cover.
Figure 8A:
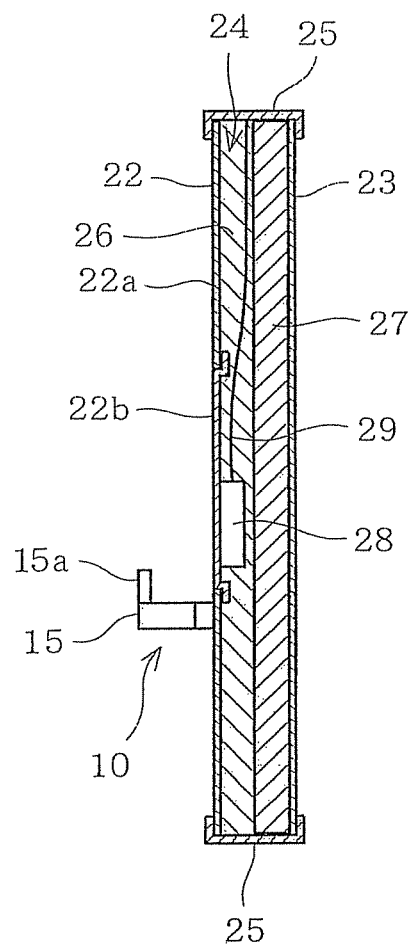
FIGS. 8A and 8B are a longitudinal section of a terminal mounting part of the refrigerating compartment door and its periphery and a longitudinal section of the terminal mounting part on which the portable information terminal to which the terminal charging cover is attached is mounted, respectively.
Figure 8B:
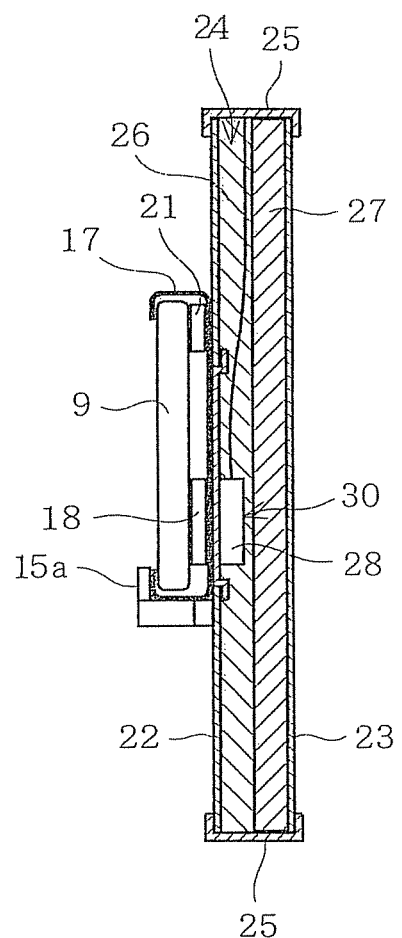

When the portable information terminal 9 is detachably attached to the terminal mounting part 10, a lower end of the portable information terminal 9 is fitted between a front wall 15a of the support member 15 and the front surface of the refrigerating compartment door 8, and a charging terminal (not shown) mounted on the lower end of the portable information terminal 9 is connected to the power-supply connecting terminal 16 (see FIG. 5). In this configuration, the portable information terminal 9 is mounted on the terminal mounting part 10 with sufficient strength when the lower end of the portable information terminal 9 is fitted between the front wall 15a of the support member 15 and the front surface of the refrigerating compartment door 8. The portable information terminal 9 is positioned by the connection between the charging terminal of the lower end of the portable information terminal 9 and the power-supply connecting terminal 16.

When detached from the terminal mounting part 10, the terminal 9 is moved upward so that the lower end of the terminal 9 is pulled out of the space between the front wall 15a of the support member 15 and the front surface of the refrigerating compartment door 8, and the charging terminal of the lower end of the terminal 9 is disconnected from the power-supply connecting terminal 16.

According to the embodiment as described above, the portable information terminal 9 is detachably mounted on the terminal mounting part 10 of the refrigerating compartment door 8. Accordingly, a place where the portable information terminal 9 is kept can be ensured. This can avoid the situation in which the portable information terminal is used while being placed on a sink cabinet and can accordingly prevent a trouble that the portable information terminal 9 gets wet with water, oil or the like or a screen of the portable information terminal 9 becomes difficult to visually recognize. Further, the portable information terminal 9 can be charged while being mounted on the terminal mounting part 10 of the refrigerating compartment door 8.

The terminal mounting part 10 is provided on the refrigerating compartment door 8 having a smaller horizontal width, namely, a smaller area than the refrigerating compartment door 7. Accordingly, the refrigerating compartment door 7 having a larger area can be opened while the portable information terminal 9 is mounted on the terminal mounting part 10 of the refrigerating compartment door 8. Accordingly, the interior of the refrigerating compartment 2 can be confirmed over a wider range, and eggs and goods stored in the meat compartment can be compared with the screen of the portable information terminal 9. The eggs are stored in the right area in the refrigerating compartment 2 and are often used in cooking. As a result, the goods stored in the refrigerating compartment 2 can be taken out while information such as a recipe displayed on the portable information terminal 9 is being confirmed. Alternatively, a list of foodstuffs to be purchased can be displayed on the portable information terminal 9 and renewed while the goods in the refrigerating compartment 2 is confirmed, with the result that the usability of the refrigerator for the users can be improved.

Further, a centrifugal force caused by the opening or closing of the refrigerating compartment door 8 or an external force due to shock or the like is smaller than an external force during the opening or closing of the refrigerating compartment door 7 having a larger area. This can more reliably prevent a situation that the portable information terminal 9 drops out of the terminal mounting part 10 during the opening or closing of the refrigerating compartment door 8.

Although the power-supply connecting terminal 16 is configured of the dock connector in the foregoing embodiment, the power-supply connecting terminal 16 may be configured of a USB connector when a USB connector is used as the power-supply connecting terminal provided on the lower end of the portable information terminal 9. Further, it is desirable that the portable information terminal 9 should display an indication, "charging" or a charging capacity while power is being supplied to the portable information terminal 9.

Although the terminal mounting part 10 is provided on the narrower refrigerating compartment door 8 in the foregoing embodiment, the terminal mounting part 10 may be mounted on the wider refrigerating compartment door 7.

Second Embodiment

FIGS. 6 to 8B illustrate a second embodiment. Identical or similar parts in the second embodiment are labeled by the same reference symbols as those in the first embodiment. In the second embodiment, the terminal power-supply part which supplies electrical power to the portable information terminal 9 is configured of a wireless power-supply device.

More specifically, a wireless power-supply terminal charging cover 17 (a wireless power-supply cover) is attached to the portable information terminal 9. The terminal charging cover 17 is divided into two parts, an upper cover 17a and a lower cover 17b, and the portable information terminal 9 is covered by the upper and lower covers 17a and 17b. The terminal charging cover 17 includes a front formed with an opening 17c through which a display and a touch panel of the portable information terminal 9 are exposed.

A wireless power receiving part 18 is provided in a lower half interior of the terminal charging cover 17. A connector cable 19 drawn out of the power receiving part 18 has a distal end provided with a connector 20 which is connected to a charging terminal of the lower end of the portable information terminal 9. A magnet 21 is mounted on an upper part of the terminal charging cover 17.

The refrigerating compartment door 8 includes an outer plate 22 (a front plate), an inner plate 23, a heat insulator 24 provided between the outer and inner plates 22 and 23, and a door cap 25. The heat insulator 24 is configured of a foam insulation 26 and a vacuum insulation panel 27 having a high heat-insulating performance. The outer plate 22 is mainly formed of an iron plate 22a (a magnetic plate) and includes a rectangular portion to which the portable information terminal 9 is to be mounted and which is formed of a non-magnetic plate 22b comprising a non-metallic plate. The non-magnetic plate 22b has an inner surface located inside the refrigerating compartment door 8 has a part which corresponds to the power receiving part 18 of the terminal charging cover 17 and which is provided with a power-supply part 28 for wireless power-supply. A cable 29 drawn out of the power-supply part 28 is buried in the refrigerating compartment door 8 to be connected to a power supply circuit (not shown) provided in the body 1 of the refrigerator.

The power receiving part 18 and the power-supply part 28 form a wireless power-supply device (a terminal power-supply part) 30 wireless-supplying power on an electromagnetic induction basis, for example. In this configuration, the lower end of the terminal charging cover 17 (the portable information terminal 9) is fitted between the front wall 15a of the support member and the front surface of the refrigerating compartment door 8, and the magnet 21 of the terminal charging cover 17 attracts the iron plate 22a of the refrigerating compartment door 8, so that the portable information terminal 9 can be mounted on the terminal mounting part 10 with a sufficient strength. In this mounted state, the portable information terminal 9 can be wireless-supplied via the power receiving part 18 and the power-supply part 28.

The construction of the second embodiment other than described above is the same as that of the first embodiment. Accordingly, the second embodiment can achieve substantially the same effect as the first embodiment. In particular, according to the second embodiment, the terminal charging cover 17 is attached to the portable information terminal 9, and the portable information terminal 9 is wireless-supplied via the power receiving part 18 and the power-supply part 28 of the wireless power-supply device 30. Accordingly, a work for connecting the charging terminal of the portable information terminal 9 is not required. Further, since the power-supply part 28 needs to be provided in the refrigerating compartment door 8 in the second embodiment, the thickness of the heat insulator 24 is reduced in the part where the power-supply part 28 is provided, so that there is a possibility of reduction in the heat insulating performance in the part where the power-supply part 28 is provided. However, the heat insulator 24 is configured of the foam insulation 26 and the vacuum insulation panel 27. As a result, sufficient heat insulating performance can be achieved even when the thickness of the heat insulator 24 is reduced.

Although the power receiving part 18 and the power-supply part 28 are configured of the wireless power-supply device 30 wireless-supplying power on an electromagnetic induction basis, the power receiving part 18 and the power-supply part 28 may be configured of a wireless power-supply device 30 wireless-supplying power on a capacitive coupling basis, instead. Further, although the support member 15 is fixed to the outer plate 22 of the refrigerating compartment door 8 in the second embodiment, a strong magnet may be provided on the mounting part of the support member 15, and the magnet may be caused to attract the iron plate 22a of the outer plate 22 so that the support member is detachably mounted on the outer plate 22 of the refrigerating compartment door 8.

Third Embodiment

Figure 9:
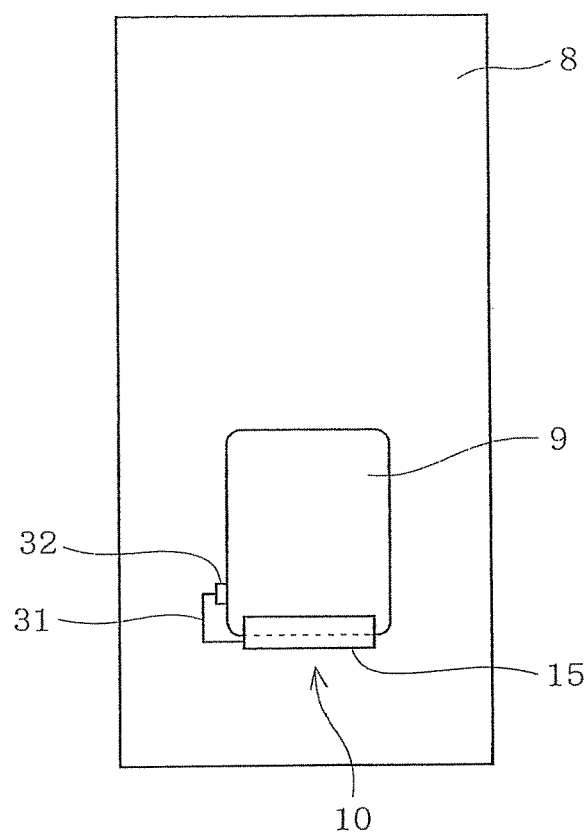
FIG. 9 is a front view of the refrigerating compartment door on which the portable information terminal is mounted, showing a third embodiment.
Figures 10A, 10B:
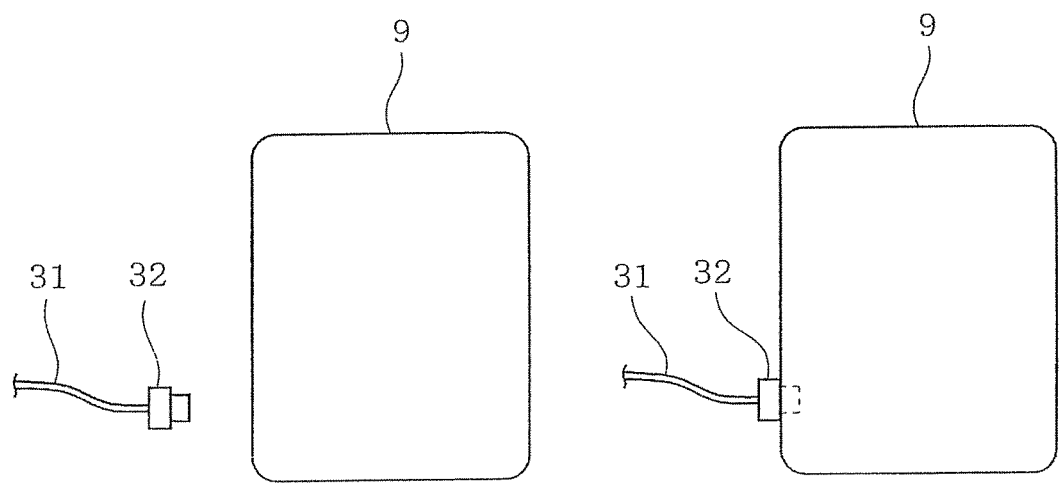
FIGS. 10A and 10B are front views of the portable information terminal before and after a relay cable is connected thereto, respectively.

FIGS. 9, 10A and 10A illustrate a third embodiment. Identical or similar parts in the third embodiment are labeled by the same reference symbols as those in the first embodiment. In the third embodiment, a relay cable 31 is provided for connecting a charging power-supply cable (not shown) drawn out of the refrigerating compartment door 8 to the charging terminal of the portable information terminal 9. The relay cable 31 has a distal end provided with a connector 32 which is connected to the charging terminal of the portable information terminal 9. In the third embodiment, when there is a plurality of types of the charging terminals of the portable information terminals 9, a plurality of types of relay cables 31 having a plurality of types of connectors 32 connectable to the charging terminals. A desirable one of the relay cables 31 can be selected to be connected to the charging power-supply cable drawn out of the refrigerating compartment door 8.

The construction of the third embodiment other than described above is the same as that of the first embodiment. Accordingly, the third embodiment can achieve substantially the same effect as the first embodiment. In particular, according to the third embodiment, even when the portable information terminals 9 have different types of charging terminals, the portable information terminals 9 can be supplied with power via the relay cable 31.

Although a plurality of types of relay cables 31 are prepared, a plurality of types of connectors connectable to a plurality of types of charging terminals may be prepared when the portable information terminals 9 have the plurality of charging terminals. A desirable one of the connectors may detachably be connected to the connector 32 at the distal end of the relay cable 31.

Fourth Embodiment

Figure 11:
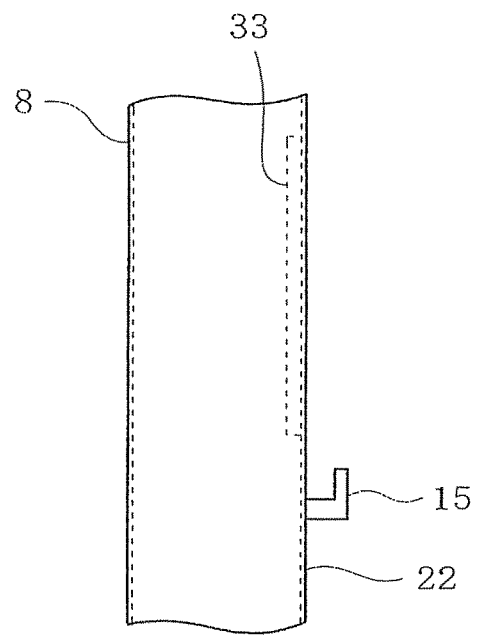
FIG. 11 is a side view of the terminal mounting part of the refrigerating compartment door and its periphery, showing a fourth embodiment.

FIG. 11 illustrates a fourth embodiment. Identical or similar parts in the fourth embodiment are labeled by the same reference symbols as those in the first embodiment. In the fourth embodiment, the inside of the outer plate 22 includes a part opposed to the portable information terminal 9 mounted on the terminal mounting part 10. A plate-shaped magnet 33 is provided on the part of the inside of the outer plate 22 when the outer plate 22 (the front plate) of the refrigerating compartment door 8 is made of a non-magnetic material.

The construction of the fourth embodiment other than described above is the same as that of the first embodiment. Accordingly, the fourth embodiment can achieve substantially the same effect as the first embodiment. In particular, according to the fourth embodiment, the plate-shaped magnet 33 is provided on the inside of the outer plate 22 when the outer plate 22 of the refrigerating compartment door 8 is made of the non-magnetic material (glass or resin, for example). Accordingly, the portable information terminal 9 can reliably be mounted on the refrigerating compartment door 8 since a magnetic body (not shown) comprising an iron plate or the like provided on the rear of the portable information terminal 9 is attracted by the magnet 33.

Although the plate-shaped magnet 33 is provided on the inside of the outer plate 22 in the embodiment, a plate-shaped member made of a magnetic material may be provided on the inside of the outer plate 22, instead. As the result of the above-described construction, it is desirable to provide a magnet on the rear or inside of the portable information terminal 9.

Fifth Embodiment

Figure 12:
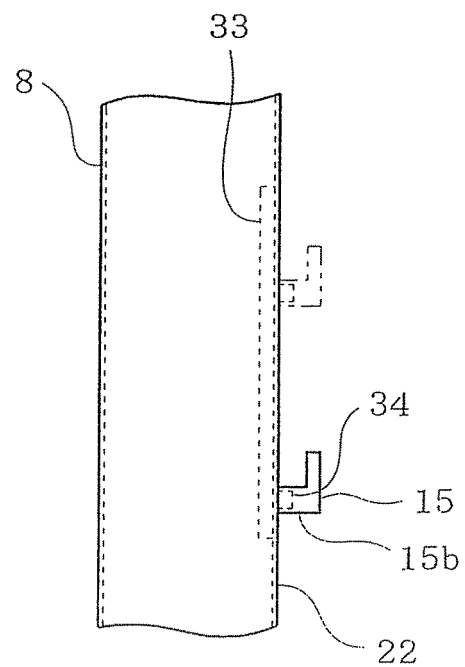
FIG. 12 is a side view of the terminal mounting part of the refrigerating compartment door and its periphery, showing a fifth embodiment.

FIG. 12 illustrates a fifth embodiment. Identical or similar parts in the fifth embodiment are labeled by the same reference symbols as those in the fourth embodiment. In the fifth embodiment, the support member 15 (the fitting support part) is movable relative to the refrigerating compartment door 8. More specifically, the support member 15 has a mounting part 15b further having a distal end provided with a strong magnet 34. The support member 15 can fixedly be mounted on the refrigerating compartment door 8 so as to be movable by causing the magnet 34 of the support member 15 to attract the magnet 33 on the inside of the outer plate 22 of the refrigerating compartment door 8. The magnet 33 need not be required when the outer plate 22 of the refrigerating compartment door 8 is made of a plate material made of a magnetic material, such as an iron plate. A plate member made of a magnetic material may be provided on the inside of the outer plate 22, instead of the plate-shaped magnet 33.

The construction of the fifth embodiment other than described above is the same as that of the fourth embodiment. Accordingly, the fifth embodiment can achieve substantially the same effect as the fourth embodiment. In particular, according to the fifth embodiment, since the support member 15 is movable relative to the refrigerating compartment door 8, the freedom of the mounting position of the portable information terminal 9 on the refrigerating compartment door 8 can be improved.

Sixth Embodiment

FIG. 12 illustrates a sixth embodiment. Identical or similar parts in the sixth embodiment are labeled by the same reference symbols as those in the first embodiment. In the sixth embodiment, the terminal mounting part 10 is provided by recessing a part of the front of the refrigerating compartment door 8. More specifically, the front of the refrigerating compartment door 8 is provided with a recess 35 sized to be capable of enclosing the portable information terminal 9. A receiving member 36 having a generally C-shaped section is provided in a lower inner part of the recess 35 as shown in FIGS. 13A and 13B. The lower end of the portable information terminal 9 is fittable in the receiving member 36. Further, the recess 35 has an upper front end provided with a pressing member 37 which comprises an elastically deformable member and protrudes downward. The upper part of the portable information terminal 9 is pressed by the pressing member 37.

The power-supply connecting terminal 16 (the terminal power supply) for supplying electrical power to the portable information terminal 9 is provided on the central bottom of the receiving member 36. The power-supply connecting terminal 16 is configured of a dock connector, for example. The cable (not shown) connected to the power-supply connecting terminal 16 is buried in the refrigerating compartment door 8 and further connected to the power-supply circuit (not shown) provided in the body 1 of the refrigerator.

The heat insulator 24 filling the interior of the refrigerating compartment door 8 is configured of the foam insulation 26 and the vacuum insulation panel 27 having the high heat-insulating performance. The vacuum insulation panel 27 is disposed along the above-mentioned recess 35 and has a larger size than the recess 35. As a result, the heat insulator 24 provided on the part of recess 35 in the inside of the refrigerating compartment door 8 and its periphery has a higher heat insulation performance than the heat insulator 24 provided on the other part in the inside of the refrigerating compartment door 8.

In the above-described construction, when the portable information terminal 9 is to be housed in the recess 35, the portable information terminal 9 is put into the recess 35 while the upper pressing member 37 of the recess 35 is being turned up. Further, the charge terminal of the lower end of the portable information terminal 16 is connected to the power-supply connecting terminal 16 and the upper end of the portable information terminal 9 is pressed by the pressing member 37 (see FIG. 13B).

The construction of the sixth embodiment other than described above is the same as that of the first embodiment. Accordingly, the sixth embodiment can achieve substantially the same effect as the first embodiment. In particular, according to the sixth embodiment, since the portable information terminal 9 is housed in the recess 35, the front surfaces of the refrigerating compartment door 8 and the portable information terminal 9 are substantially co-planar, with the result that an appearance of the refrigerating compartment door 8 can be improved.

Since the recess 35 is provided in the refrigerating compartment door 9 in the sixth embodiment, the thickness of the heat insulator 24 is reduced with a result that there is a possibility that the heat insulating performance is reduced. In the sixth embodiment, however, the heat insulator 24 is configured of the foam insulation 26 and the vacuum insulation panel 27. As a result, a sufficient heating insulating performance can be obtained even when the thickness of the heat insulator 24 is reduced.

Seventh Embodiment

Figure 15:
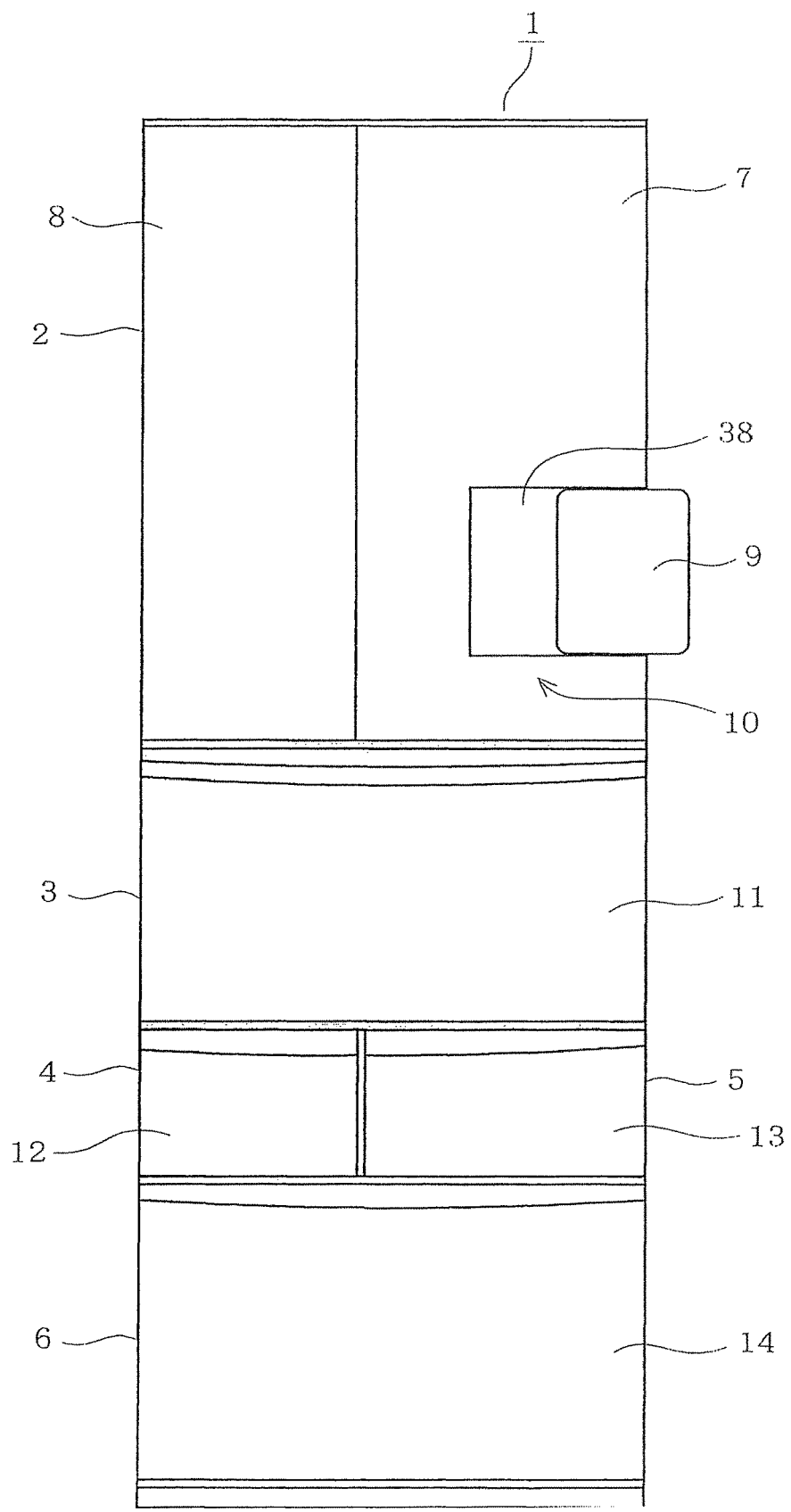
FIG. 15 is a view similar to FIG. 1, showing a half-mounted portable information terminal.

FIGS. 14A, 14B and 15 illustrate a seventh embodiment. Identical or similar parts in the seventh embodiment are labeled by the same reference symbols as those in the sixth embodiment. In the seventh embodiment, the recess 38 has one side (the right side as viewed in FIG. 15) that is open in one side (the right side as viewed in FIG. 15) of the refrigerating compartment door 7. In this case, the refrigerating compartment door 7 is of a biparting type and the recess 38 has the side opening provided in an outwardly located side of the refrigerating compartment door 7.

Rail members 39 and 40 each of which has a generally C-shaped section are provided on the upper and lower parts of the recess 38 respectively as shown in FIGS. 14A and 14B. The rail members 39 and 40 guide the portable information terminal 9 when the portable information terminal 9 is put into and taken out of the recess 38. In this case, the portable information terminal 9 is put into and taken out of the recess 38 through the side opening of the recess 38 as shown in FIG. 15. It is desirable that the power-supply connecting terminal supplying electrical power to the portable information terminal 9 should be provided on an inner surface of the left side of the recess 38 as viewed in FIG. 15. Further, the relay cable 31 employed in the third embodiment may be used to supply electrical power to the portable information terminal 9 or alternatively, the wireless power supply device 30 employed in the second embodiment may be used to supply electrical power to the portable information terminal 9.

The construction of the seventh embodiment other than described above is the same as that of the sixth embodiment. Accordingly, the seventh embodiment can achieve substantially the same effect as the sixth embodiment. In particular, according to the seventh embodiment, the rail members 39 and 40 are provided on the upper and lower parts of the recess 38 respectively, and the portable information terminal 9 is put into and taken out of the recess 38 through the side opening thereof. Accordingly, the portable information terminal 9 can reliably be mounted on the refrigerating compartment door 7 with the result that the portable information terminal 9 can reliably be prevented from dropping out of the recess 38 by a centrifugal force in the opening and closing of the refrigerating compartment door 7, shock or the like.

Eighth Embodiment

Figure 16:
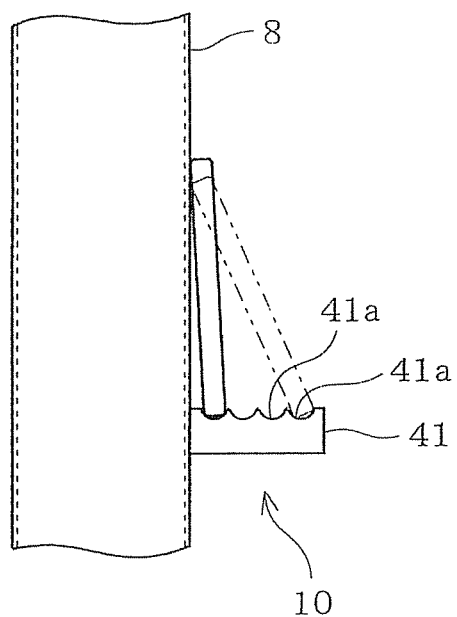
FIG. 16 is a view similar to FIG. 2, showing an eighth embodiment.

FIG. 16 illustrates an eighth embodiment. Identical or similar parts in the eighth embodiment are labeled by the same reference symbols as those in the first embodiment. In the eighth embodiment, the portable information terminal 9 can be mounted in the terminal mounting part 10 while being inclined relative to the terminal mounting part 10.

More specifically, a plurality of, for example, four grooves 41a are formed in an upper surface of the support member 41 of the terminal mounting part 10. The lower end of the portable information terminal 9 is fitted in a desired one of the grooves 41a so as to be supported. As a result, the portable information terminal 9 can be mounted while being inclined at a desirable inclination angle. In this case, since the grooves 41a are formed in the upper surface of the support member 41, the inclination angle of the portable information terminal 9 can be adjustable in four stages.

The construction of the eighth embodiment other than described above is the same as that of the first embodiment. Accordingly, the eighth embodiment can achieve substantially the same effect as the first embodiment. In particular, according to the eighth embodiment, since the portable information terminal 9 can be mounted on the refrigerating compartment door 8 in an inclined state, the user can more easily view the screen of the portable information terminal 9. Further, in the eighth embodiment, the four grooves 41a are formed in the upper surface of the support member 41, so that the inclination angle of the portable information terminal 9 can be adjusted to a desirable angle. As a result, the screen of the portable information terminal 9 can be viewed more easily.

The number of the grooves 41 formed in the upper surface of the support member 41 should not be limited to four but may be five or above, three or two.

Ninth Embodiment

Figure 17:
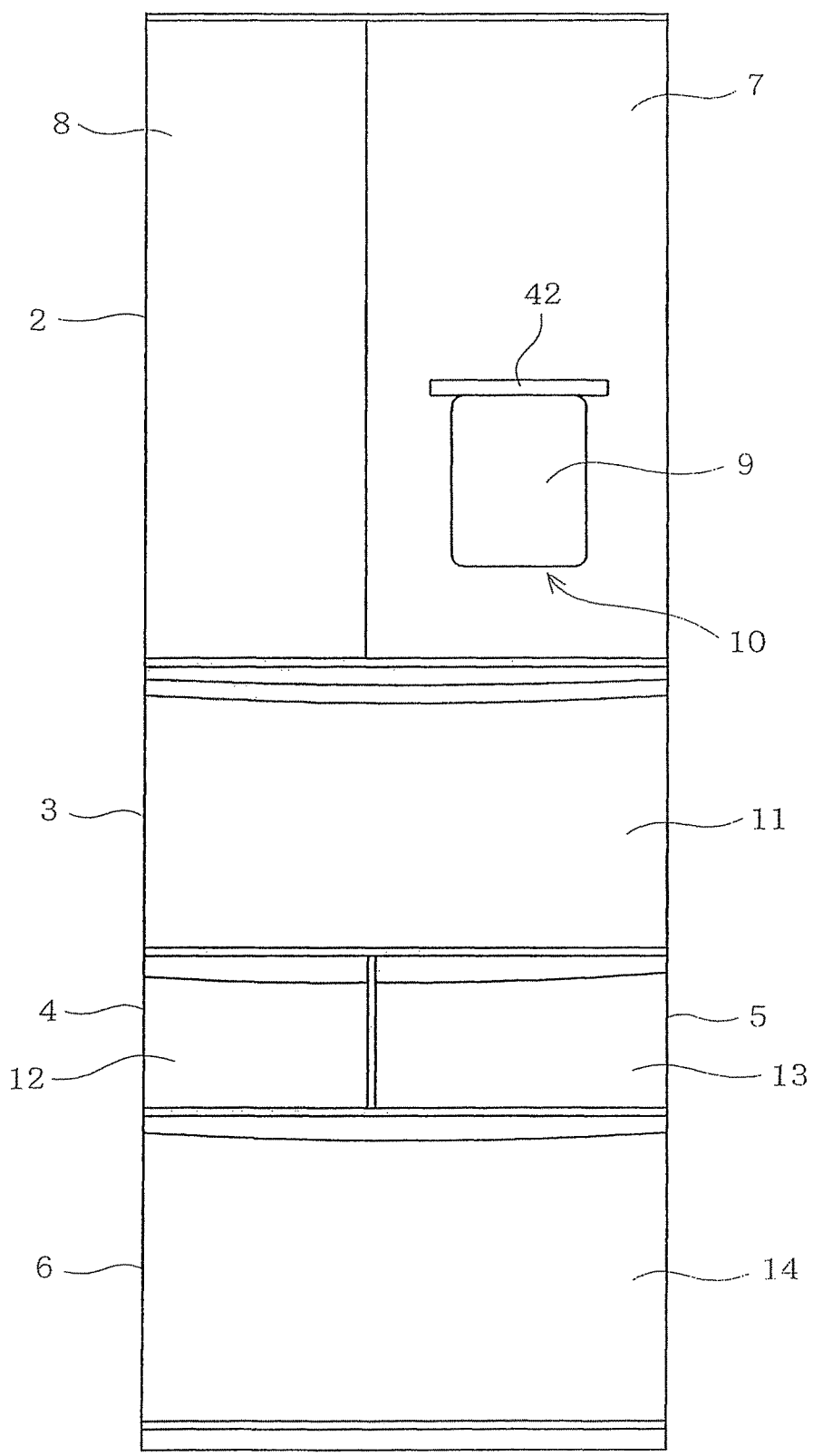
FIG. 17 is a view similar to FIG. 1, showing a ninth embodiment.
Figure 20:
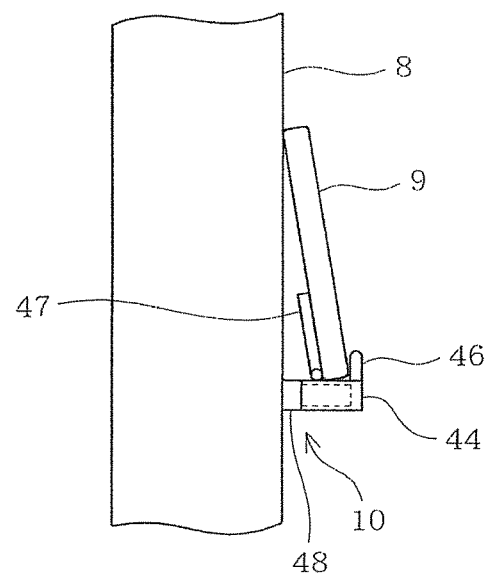
FIG. 20 is a view similar to FIG. 2, showing an eleventh embodiment.
Figure 21:
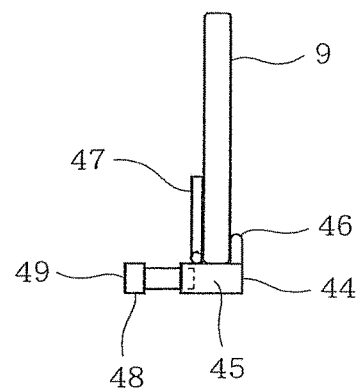
FIG. 21 is a side view of a support member.
Figure 22:
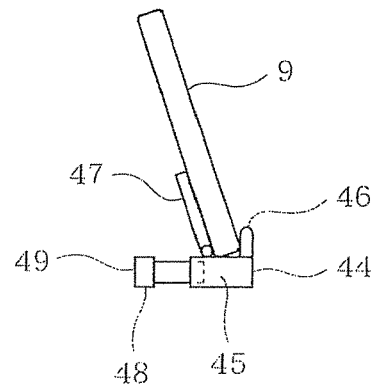
FIG. 22 is a side view of the support member in a different mode.

FIGS. 17 and 18 illustrate a ninth embodiment. Identical or similar parts in the ninth embodiment are labeled by the same reference symbols as those in the sixth embodiment. In the ninth embodiment, eaves 42 are provided on the top of the terminal mounting part 10 on the front surface of the refrigerating compartment door 7. The eaves 42 have a larger right-left dimension than the terminal mounting part 10 as shown in FIG. 17 and are formed to protrude forward as shown in FIG. 18.

The construction of the ninth embodiment other than described above is the same as that of the sixth embodiment. Accordingly, the ninth embodiment can achieve substantially the same effect as the sixth embodiment. In particular, according to the ninth embodiment, since the eaves 42 are provided on the top of the terminal mounting part 10 on the front surface of the refrigerating compartment door 7, the portable information terminal 9 can be prevented from suffering water drops, oil drops or the like.

FIGS. 19A and 19B illustrate a tenth embodiment. Identical or similar parts in the tenth embodiment are labeled by the same reference symbols as those in the sixth embodiment. In the tenth embodiment, for example, a transparent cover 43 covering the front surface of the terminal mounting part 10 is provided on the front surface of the refrigerating compartment door 8 so as to be slidable in the up-down direction. The cover 43 may be made of a translucent or opaque member.

The construction of the tenth embodiment other than described above is the same as that of the sixth embodiment. Accordingly, the tenth embodiment can achieve substantially the same effect as the sixth embodiment. In particular, according to the tenth embodiment, since the cover 43 is provided so as to cover the front surface of the terminal mounting part 10, the portable information terminal 9 can be covered by the cover 43 when not used or when the touch panel thereof is not operated. As a result, the portable information terminal 9 can further be prevented from suffering water drops, oil drops or the like.

Eleventh Embodiment

FIGS. 20 to 24 illustrate an eleventh embodiment. Identical or similar parts in the eleventh embodiment are labeled by the same reference symbols as those in the first embodiment. In the eleventh embodiment, the support member 44 (the fitting support part) is detachably provided on the refrigerating compartment door 8 and is configured to serve as a stand for the portable information terminal 9 when the terminal 9 is detached.

Figure 23:
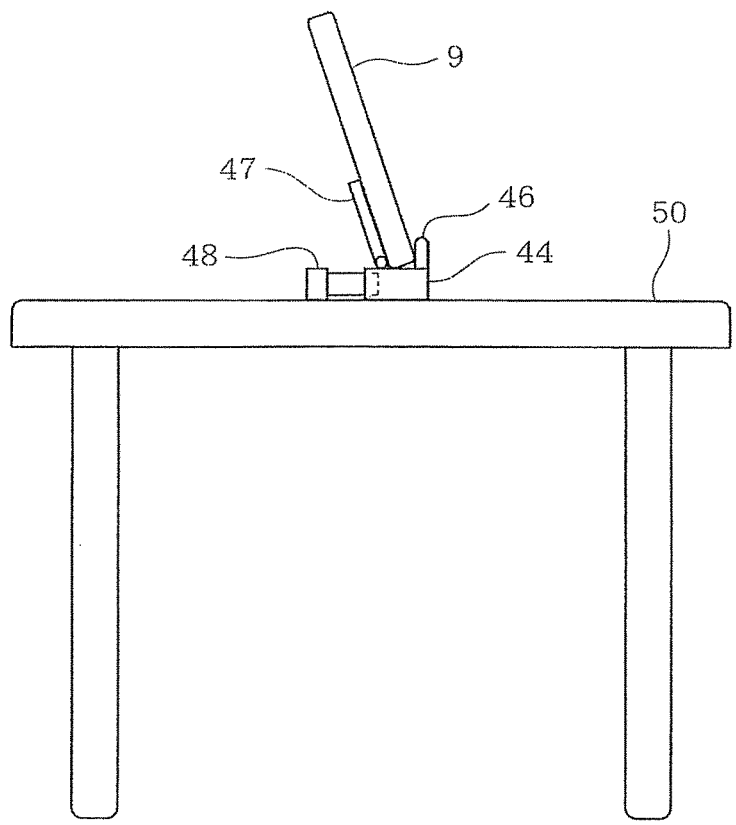
FIG. 23 is a side view of the support member used as a mount of the portable information terminal.
Figure 24:
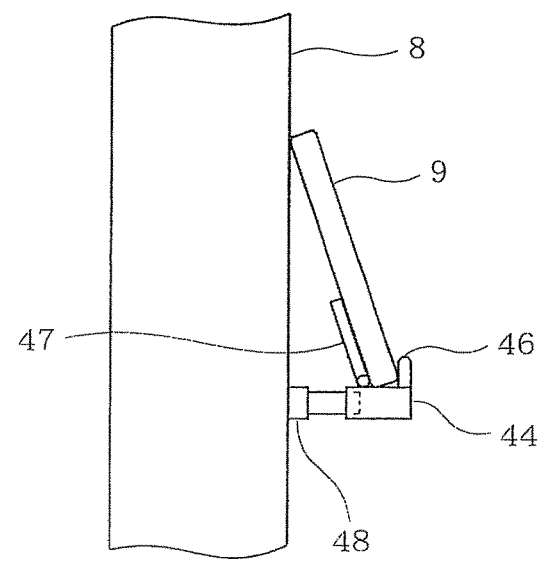
FIG. 24 is a view similar to FIG. 20, showing a different mode thereof.

More specifically, the support member 44 includes a body 45, a front guide 46 protruding from a top front end of the body 45, a rear guide member 47 provided on the central top of the body 45 so that an inclination angle thereof is adjustable, and a mounting member 48 provided on a rear part of the body 45 so as to be expansible rearward. The mounting member 48 has a rear end provided with a strong magnet 49. The support member 44 is stuck to the outer plate (the front plate) of the refrigerating compartment door 8 with the magnet 49. The outer plate is made of, for example, an iron plate. The lower end of the portable information terminal 9 is fitted between the front guide portion 46 and the rear guide member 47 thereby to be held therebetween. In this case, the inclination angle of the portable information terminal 9 is adjustable by adjusting the inclination angle of the rear guide member 47 (see FIGS. 20 to 24). Further, the support member 44 detached from the refrigerating compartment door 8 is stably placeable on the top of a desk 50 by extending the mounting member 48 rearward, as shown in FIG. 23. More specifically, the support member 44 can be used as a stand for the portable information terminal 9. In the embodiment, it is desirable that power supply (charge) to the portable information terminal 9 should be carried out by the wireless power supply device (see the second embodiment). Further, power supply to the portable information terminal 9 may be carried out by the relay cable (see the third embodiment).

The construction of the eleventh embodiment other than described above is the same as that of the first embodiment. Accordingly, the eleventh embodiment can achieve substantially the same effect as the first embodiment. In particular, according to the eleventh embodiment, the support member 44 detached from the refrigerating compartment door 8 can be used as the stand for the portable information terminal 9, the usability of the support member 44 can be improved.

Twelfth Embodiment

Figure 25:
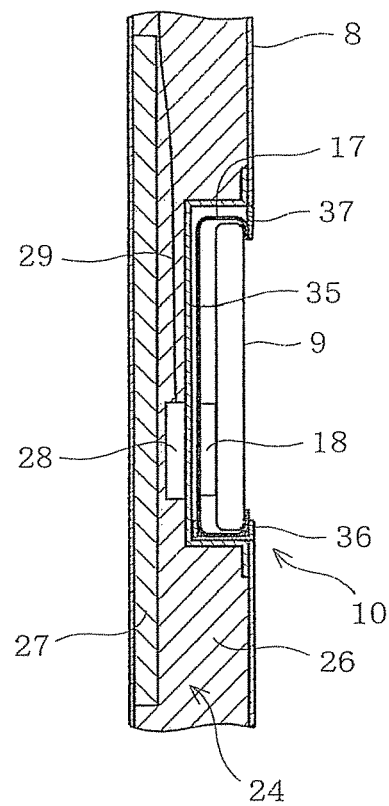
FIG. 25 is a view similar to FIG. 18, showing a twelfth embodiment.

FIG. 25 illustrates a twelfth embodiment. Identical or similar parts in the twelfth embodiment are labeled by the same reference symbols as those in the second or sixth embodiment. In the twelfth embodiment, the portable information terminal 9 to which the terminal charging cover 17 is attached is configured to be detachably housed in the recess 35 of the refrigerating compartment door 8, and the power supply part 28 is provided on a rear surface of the recess 35 in the refrigerating compartment door 8.

In this construction, when the portable information terminal 9 to which the terminal charging cover 17 is housed in the recess 35 of the refrigerating compartment door 8, wireless power supply is performed via the power supply part 28 and the power receiving part 18 to the portable information terminal 9.

The construction of the twelfth embodiment other than described above is the same as that of the second or sixth embodiment. Accordingly, the twelfth embodiment can achieve substantially the same effect as the second or sixth embodiment.

Thirteenth Embodiment

Figure 26A:
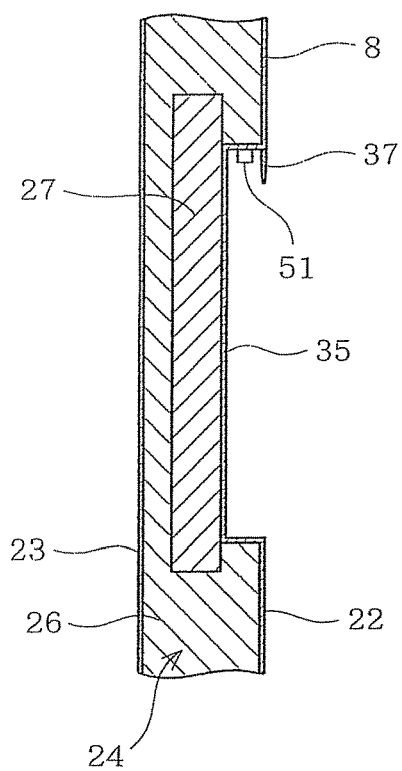
FIGS. 26A and 26B are views similar to FIGS. 13A and 13B respectively, showing a thirteenth embodiment.
Figure 26B:
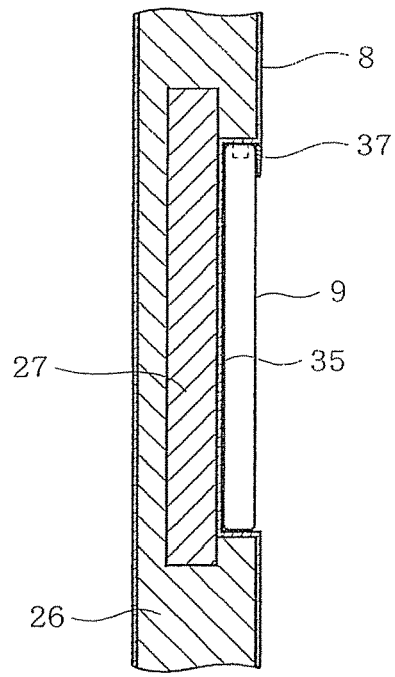

FIGS. 26A and 26B illustrate a thirteenth embodiment. Identical or similar parts in the thirteenth embodiment are labeled by the same reference symbols as those in the sixth embodiment. In the thirteenth embodiment, a power-supply connecting terminal 51 is provided on an inner upper surface of the recess 35 of the refrigerating compartment door 8. The portable information terminal 9 is housed into the recess 35 of the refrigerating compartment door 8 while the charge terminal provided on the upper part of the portable information terminal 9 is connected to the power-supply connecting terminal 51. Further, when at least the portable information terminal 9 is housed in the recess 35, the screen of the portable information terminal 9 in a standby mode is configured to display an image having the same color as the front surface of the refrigerating compartment door 8 or the same design as that of the front of the refrigerating compartment door 8.

The construction of the thirteenth embodiment other than described above is the same as that of the sixth embodiment. Accordingly, the thirteenth embodiment can achieve substantially the same effect as the sixth embodiment. In particular, according to the thirteenth embodiment, the part connecting the charge terminal of the portable information terminal 9 and the afore-mentioned power-supply connecting terminal 51 to each other is located on the upper part and moreover, the power-supply connecting terminal 51 is directed downward. Accordingly, water drops, oil drops or the like are hard to be splashed on the power-supply connecting terminal 51 and the vicinity of the receiving terminal of the portable information terminal 9. Further, in the thirteenth embodiment, the power-supply connecting terminal 51 is provided on the upper inner surface of the recess 35, and the portable information terminal 9 is housed in the recess 35 of the refrigerating compartment door 8. Accordingly, the power-supply connecting terminal 51 and the vicinity of the charge terminal of the portable information terminal 9 can further be prevented from being splashed with water drops, oil drops or the like. Further, when the portable information terminal 9 is housed in the recess 35, the screen of the portable information terminal 9 in the standby mode is configured to display an image having the same color as the front surface of the refrigerating compartment door 8 or the same design as that of the front of the refrigerating compartment door 8. As a result, an appearance of the front of the refrigerating compartment door 8 can be improved in the case where the portable information terminal 9 stands by.

Fourteenth Embodiment

FIGS. 27 to 29B illustrate a fourteenth embodiment. Identical or similar parts in the fourteenth embodiment are labeled by the same reference symbols as those in the sixth embodiment. In the fourteenth embodiment, a buffer 52 having a generally T-shaped section is provided on an opening peripheral edge of the recess 35 serving as the terminal mounting part 10 in the refrigerating compartment door 8.

Figure 27:
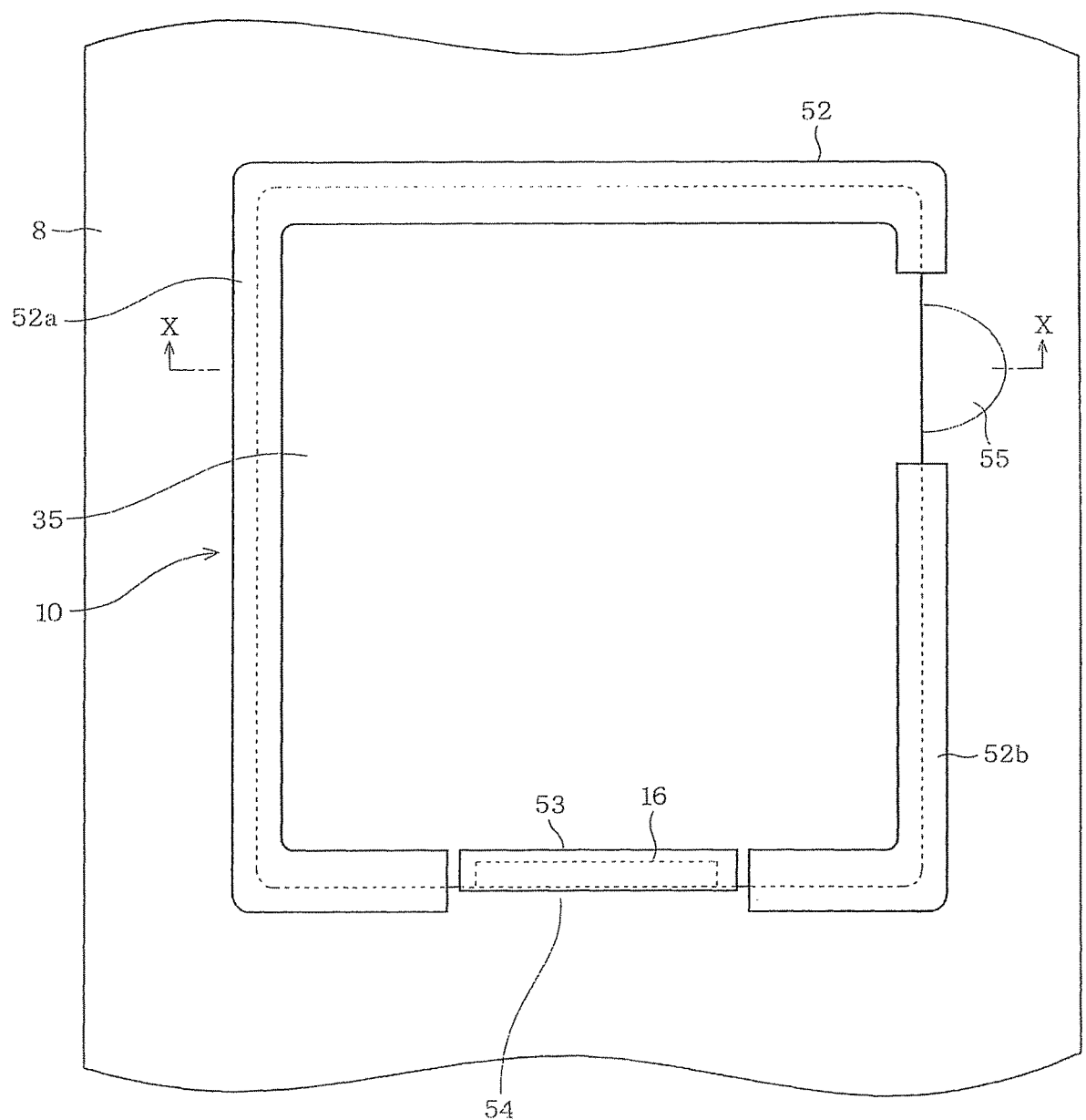
FIG. 27 is a front view of the terminal mounting part and its periphery, showing a fourteenth embodiment.

The buffer 52 includes a first buffer 52a and a second buffer 52b as shown in FIG. 27. The first buffer 52a is provided so as to correspond to an upper side, a left side, an upper right side and a lower left side of the recess 35. The second buffer 52b is provided so as to correspond to a lower half of the right side and a right part of lower side of the recess 35.

Figure 28:
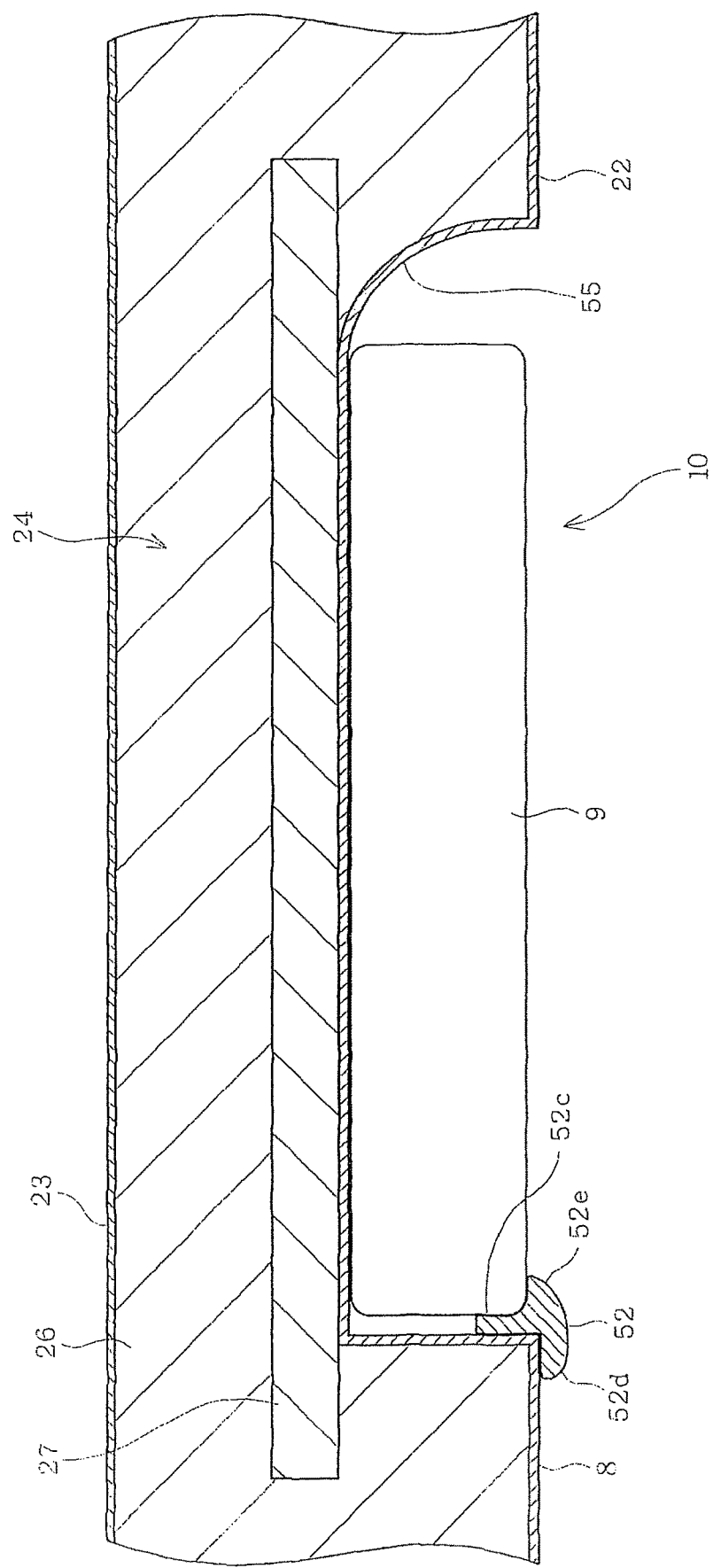
FIG. 28 is a sectional view taken along line X-X in FIG. 27 with the portable information terminal being mounted.
Figure 29A:
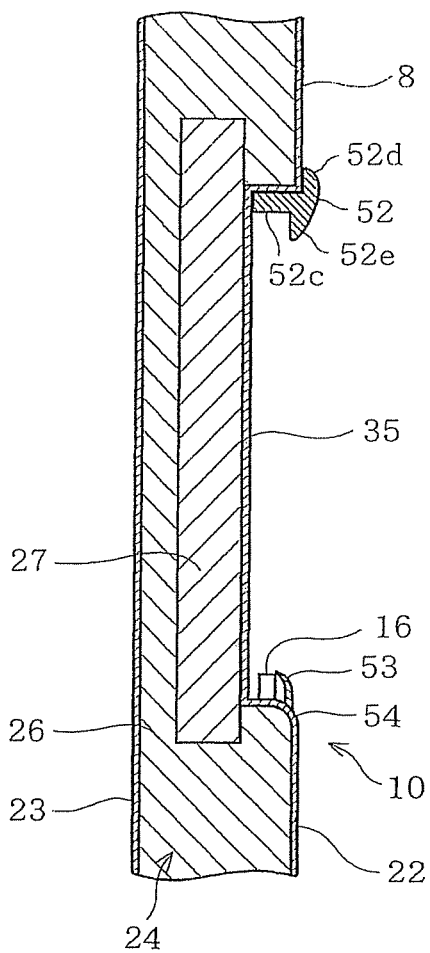
FIGS. 29A and 29B are views similar to FIGS. 13A and 13B respectively, showing the fourteenth embodiment.
Figure 29B:
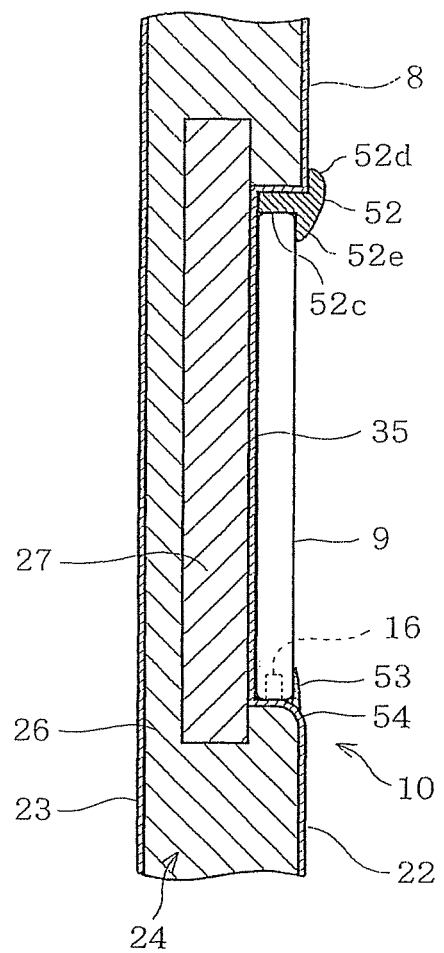

The buffer 52 comprises a member which is an elastically deformable non-metal or non-magnetic material and has insulation properties, such as rubber packing, resin packing or silicon rubber. The buffer 52 has a mounting piece 52c abutting on the inner peripheral wall surface of the recess 35, an outwardly protruding piece 52d abutting on the opening edge of the recess 35 and an inwardly protruding piece 52e protruding inward, as shown in FIGS. 28, 29A and 29B. The mounting piece 52c is bonded to the inner peripheral wall surface of the recess 35, for example and the outwardly protruding piece 52d is bonded to the opening edge of the recess 35, for example, so that the buffer 52 is mounted on the terminal mounting part 10 of the refrigerating compartment door 8. The mounting piece 52c and the outwardly protruding piece 52d may be screwed or press fitted, instead of being bonded. The front peripheral edge of the portable information terminal 9 is pressed by the inwardly protruding piece 52e of the buffer 52 when the portable information terminal 9 is housed in the recess 35, as shown in FIG. 29B.

Further, the outer plate 22 of the refrigerating compartment door 8 is made of a non-metal or non-magnetic material, for example, glass or resin. Further, the power-supply connecting terminal (the terminal power supply) 16 is provided on the central inner peripheral wall surface of the lower side of the recess 35 in order to supply electrical power to the portable information terminal 9. The power-supply connecting terminal 16 is configured of a dock connector, for example. The cable (not shown) connected to the power-supply connecting terminal 16 is buried in the refrigerating compartment door 8 and further connected to the power-supply circuit (not shown) provided in the body 1 of the refrigerator.

A flexible fin-like rib (waterproof structure) protrudes upward from the inner peripheral wall surface of the lower side of the recess 35 so as to be located in front of (around) the power-supply terminal 16. The rib 53 has a larger right-left dimension than the power-supply connecting terminal 16. The rib 53 is configured of a member which is an elastically deformable non-metal or non-magnetic material and has insulation properties, such as a rubber buffer, a resin buffer or silicon rubber, like the buffer 52. Further, the opening edge of the lower side of the recess 35 includes a part which is located in front of the rib 53 and provided with an inclined part 54 having a downwardly inclined front side.

When the buffer 52 is disposed around an entire circumference of the recess 35, the rib 53 is configured so that the location where the rib 53 is brought into contact with the portable information terminal 9 is at least inside the location where the buffer 52 is brought into contact with the portable information terminal 9, namely, is located at the side nearer the power-supply connecting terminal 16.

In the embodiment, the buffer 52 is not provided over the entire peripheral edge of the recess 35, and the recess 35 includes a part which is located in front of the power-supply connecting terminal 16 and is not provided with the buffer 52. Further, a right side upper part of the peripheral edge of the recess 35 includes a part provided with no buffer 52. A terminal detaching mechanism 55 is provided on the part provided with no buffer 52 in order to detach the portable information terminal 9. The terminal detaching mechanism 55 is formed into a recessed shape such that the user puts his/her fingers between the portable information terminal 9 and the terminal mounting part 10 thereby to push the terminal 9 from the rear to the front out of the terminal mounting part 10 (see FIG. 28). The buffer 28 may be provided over the entire circumference of the recess 35 or may be provided on only the upper side or only the lateral sides. Thus, the buffer 52 may be provided on a part of the peripheral edge of the recess 35.

In the above-described construction, when the portable information terminal 9 is housed in the recess 35, the portable information terminal 9 is put into the recess 35 while the inwardly protruding piece 52e of the buffer 52 on the peripheral edge of the recess 35 is turned up. Further, the charge terminal of the lower end of the portable information terminal 9 is connected to the power-supply connecting terminal 16. The front peripheral edge of the portable information terminal 9 is pressed by the inwardly protruding piece 52e of the buffer 52 when the portable information terminal 9 is housed in the recess 35 (see FIG. 29B). In this case, a distal end of the fin-like rib 53 provided in front of the power-supply terminal 16 is in contact with the lower part of the portable information terminal 9.

The construction of the fourteenth embodiment other than described above is the same as that of the sixth embodiment. Accordingly, the fourteenth embodiment can achieve substantially the same effect as the sixth embodiment. In particular, according to the fourteenth embodiment, since the buffer 52 is provided on the peripheral edge of the recess 35, the glass or resin used in the refrigerating compartment door 8 is not brought into direct contact with the portable information terminal 9. This can prevent fine contacting and accordingly production of abnormal noise due to oscillation or vibration.

Further, since the non-metal material or non-magnetic material is used for all the outer plate 22, the buffer 52 and the rib 53, the portable information terminal 9 is surrounded by a member which hardly blocks electric waves with the result that the receiving sensitivity of the portable information terminal 9 can be prevented from being deteriorated.

The fin-like rib 53 is reliably brought into contact with the lower front of the portable information terminal 9 even when the terminal 9 is rounded in shape. As a result, even when water splashed onto the front of the refrigerating compartment door 8 moves downward along the front of the portable information terminal 9, the water flows downward along the front and the inclined part 54 of the rib without reaching the power-supply connecting terminal 16. Accordingly, the water splashed onto the front of the refrigerating compartment door 8 can reliably be prevented from reaching the power-supply connecting terminal 16 and water can be prevented from collecting in the lower area inside the recess 35.

Further, the buffer 52 is formed of the insulating material. This can block a path along which static electricity flows through the portable information terminal 9 to the refrigerating compartment door 8. As a result, the user can be prevented from suffering pain due to the static electricity.

The position of the power-supply connecting terminal 16 should not be limited to the central lower side of the recess 35 but may be provided in the right or left side of the recess 35. In this case, the rib 53 is provided above the power-supply connecting terminal 16 so as to be brought into contact with the portable information terminal 9, so that water is prevented from flowing into the power-supply connecting terminal 16 from above.

Further, the detaching mechanism 55 should not be limited to the recessed shape. A mechanism may be provided which pushes the portable information terminal 9 out of the recess from behind when the user pushes a button. Furthermore, the inwardly protruding piece 52e pressing the peripheral edge of the portable information terminal 9 may be pulled by the user in a direction opposite the pressing direction of the piece 52e thereby to be turned up. More specifically, it is desirable that a fin-like member should stand as a knob the user can grasp.

Fifteenth Embodiment

Figure 30:
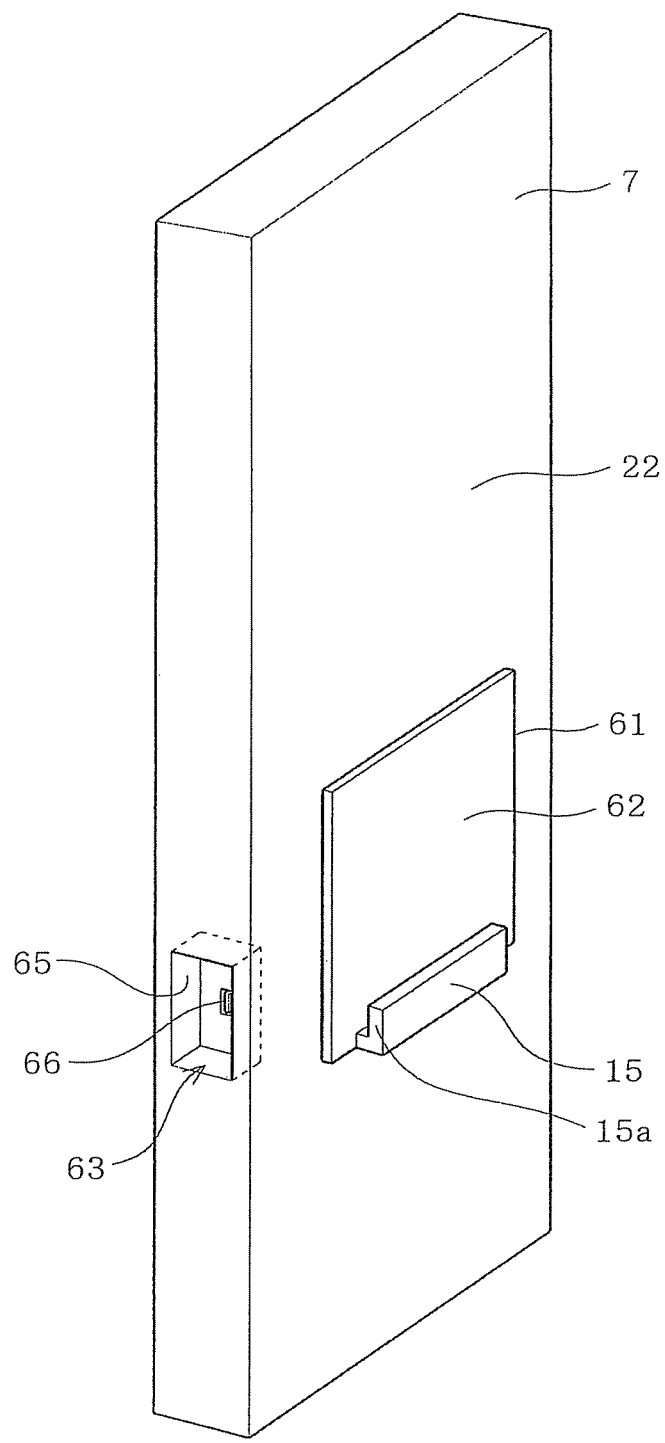
FIG. 30 is a perspective view of the refrigerating compartment door in a fifteenth embodiment.
Figure 31:
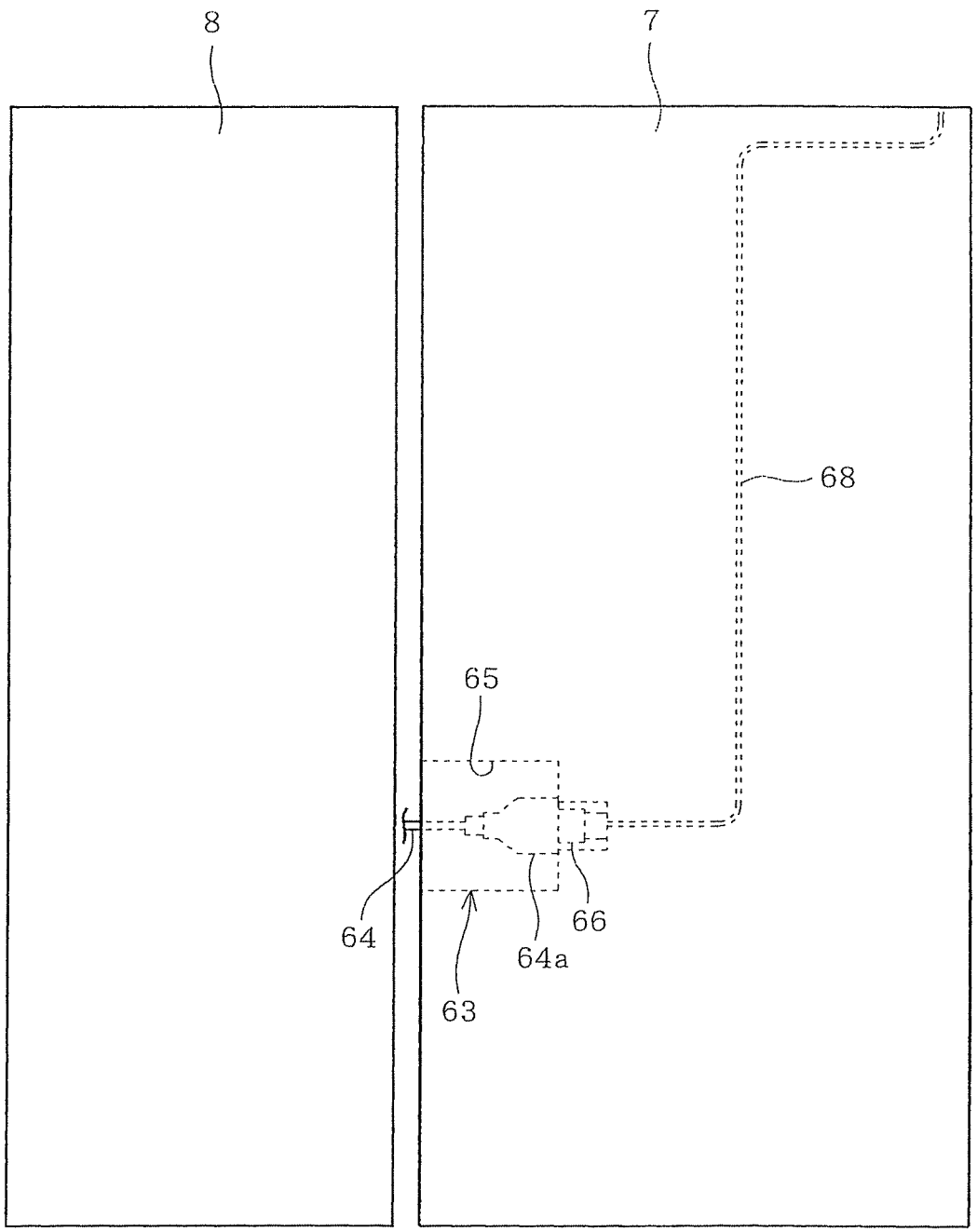
FIG. 31 is a front view of the refrigerating compartment door.
Figure 32:
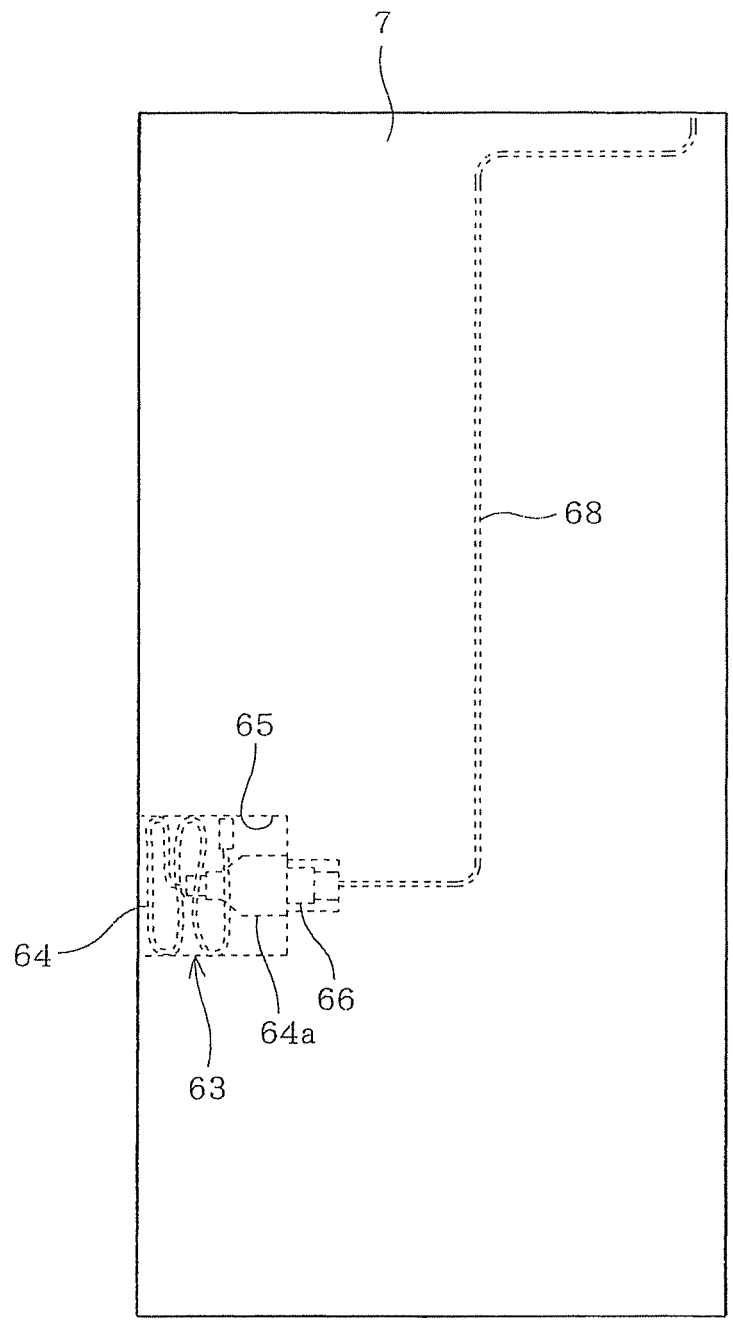
FIG. 32 is a view similar to FIG. 31, showing a connecting cable housed in a recess of a terminal part.

FIGS. 30 to 33 illustrate a fifteenth embodiment. Identical or similar parts in the fifteenth embodiment are labeled by the same reference symbols as those in the first embodiment. In the fifteenth embodiment, a terminal holder 61 (the terminal mounting part) detachably holding the portable information terminal 9 is detachably mounted on the front of the refrigerating compartment door 7 of the refrigerator, as shown in FIG. 30. The terminal holder 61 includes a base plate 62 and the support member 15 provided on a lower end of the base plate 62. In this case, the lower end of the portable information terminal 9 is fitted between a front wall 15a of the support member 15 and a front of the base plate 62, so that the terminal 9 is detachably held on the terminal holder 61 with sufficient strength.

The base plate 62 is provided with, for example, a magnet (not shown). The terminal holder 61 is detachably stuck to the front of the refrigerating compartment door 7 with the magnet 49. The portable information terminal 9 is mounted on the refrigerating compartment door 7 independent of the refrigerator by using the terminal holder 61 configured as described above. More specifically, the refrigerating compartment door 7 of the refrigerator is provided with no special structure for mounting the portable information terminal 9, and the front of the refrigerating compartment door 7 has the same construction as an ordinary refrigerating compartment door when the terminal holder 61 is detached from the refrigerating compartment door 7.

When the front plate of the refrigerating compartment door 7 is made of a non-magnetic material such as glass, a magnetic plate (not shown) such as iron is provided at the inner surface side of the front plate 22, and the terminal holder 61 is stuck to the magnetic plate with the magnet. Further, a suction disk may be provided on the base plate 62 of the terminal holder 61 so as to be stuck to the front plate 22 of the refrigerating compartment door 7, instead of the magnet. As a result, the base plate 62 of the terminal holder 61 can be stuck to the front plate 22 of the refrigerating compartment door 7 even when the front plate 22 of the refrigerating compartment door 7 is made of a non-magnetic material such as glass.

Figure 33:
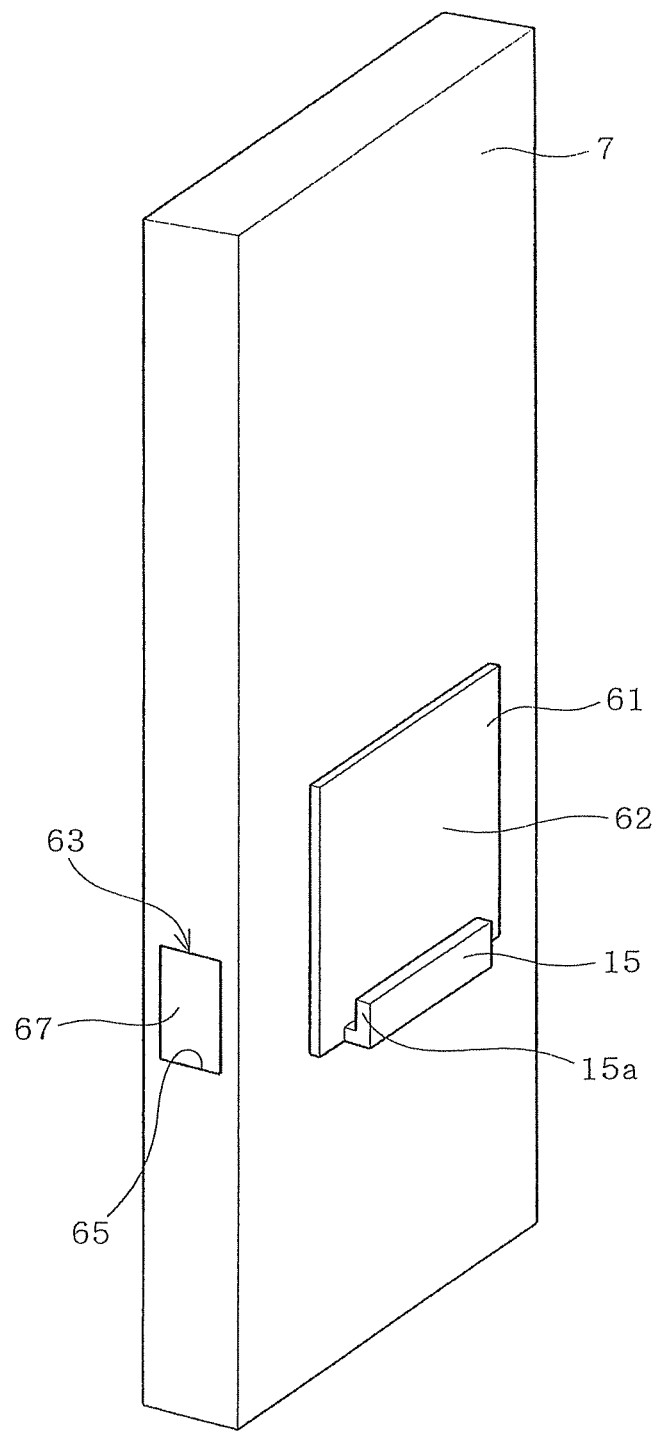
FIG. 33 is a view similar to FIG. 30, showing an opening of the recess closed by a cover.

For example, a connecting part 63 serving as a power supply unit is provided on, for example, the left side of the refrigerating compartment door 7. The connecting part 63 is connected via a connecting cable 64 (see FIGS. 31 and 32) to the portable information terminal 9. The connecting part 63 includes a recess 65 provided in the refrigerating compartment door 7 and a connector 66 provided on a bottom of the recess 65 and comprising a USB connector, for example. An interior of the recess 65 defines a space which can house the connecting cable 64 detached from the portable information terminal 9 (see FIG. 32). Furthermore, the recess 65 has an opening which is configured to be closed by a cover 67 as shown in FIG. 33. For example, the cover 67 has an engagement protrusion and an engagement recess (neither shown) which are fitted with each other so that the cover 67 can detachably be mounted in the opening of the recess 65.

Further, a cable 68 (a charging power-supply cable) connected to the connector 66 is buried in the refrigerating compartment door 7 and connected to a power-supply circuit (not shown) provided in the body 1 of the refrigerator. As a result, constant voltage power generated by the power-supply circuit from AC power supplied from a power-supply outlet is supplied through the cable 68, the connector 66 and the connecting cable 64 to the portable information terminal 9.

The construction of the fifteenth embodiment other than described above is the same as that of the first embodiment. Accordingly, the fifteenth embodiment can achieve substantially the same effect as the first embodiment. In particular, according to the fifteenth embodiment, since the connecting part 63 is provided on the side of the refrigerating compartment door 7, power can be supplied to the portable information terminal 9 when one end terminal 64a of the connecting terminal 64 is connected to the connector 66 of the connecting part and the other terminal of the connecting cable 64 is connected to a power-supply connecting part (not shown) of the portable information terminal 9.

Further, since the connecting cable 64 can be housed in the recess 65 of the connecting part 63 in the fifteenth embodiment, the connecting cable 64 detached from the portable information terminal 9 can easily be housed in the recess 65 with the result that the handleability of the connecting cable 64 can be improved. Furthermore, the opening of the recess 65 of the connecting part 63 can be closed by the cover 67. Accordingly, the opening of the recess 65 is closed by the cover 67 when power is not supplied to the portable information terminal 9, with the result that the appearance of the connecting part 63 and its periphery can be improved.

Although the connecting part 63 is provided in the left side of the refrigerating compartment door 7, for example, the connecting part 63 may be provided in the right side, the top or the underside of the refrigerating compartment door 7.

Sixteenth Embodiment

Figure 34:
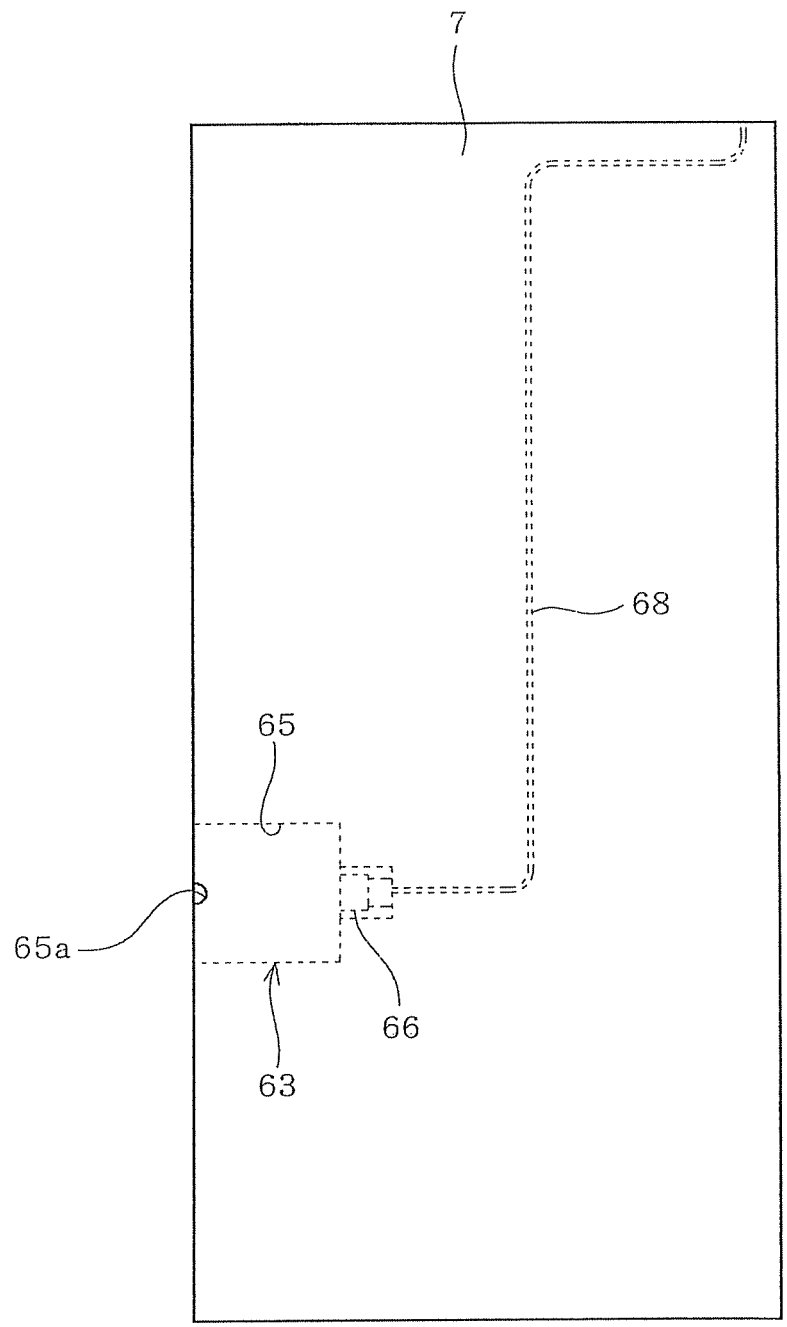
FIG. 34 is a view similar to FIG. 32, showing a sixteenth embodiment.

FIG. 34 illustrates a sixteenth embodiment. Identical or similar parts in the sixteenth embodiment are labeled by the same reference symbols as those in the fifteenth embodiment. In the sixteenth embodiment, a groove 65a in which the connecting cable 64 is fittable (insertable) is formed in the front side of the opening edge of the recess 65 of the connecting part 63, as shown in FIG. 34. In this case, the connecting cable 64 connected to the connector 66 of the connecting part 63 can be drawn through the groove 65a in front of the refrigerating compartment door 7. The opening of the recess 65 can be closed by the cover 67 when the connecting cable 64 is drawn forward through the groove 65a.

The construction of the sixteenth embodiment other than described above is the same as that of the fifteenth embodiment. Accordingly, the sixteenth embodiment can achieve substantially the same effect as the fifteenth embodiment. In particular, according to the sixteenth embodiment, the connecting cable 64 connected to the connector 66 of the connecting part 63 can be drawn forward through the groove 65a, and the opening of the recess 65 can be closed by the cover 67. Accordingly, the connecting cable 64 can be positioned and the appearance of the connecting part 63 and its periphery can be improved.

Seventeenth Embodiment

Figure 35:
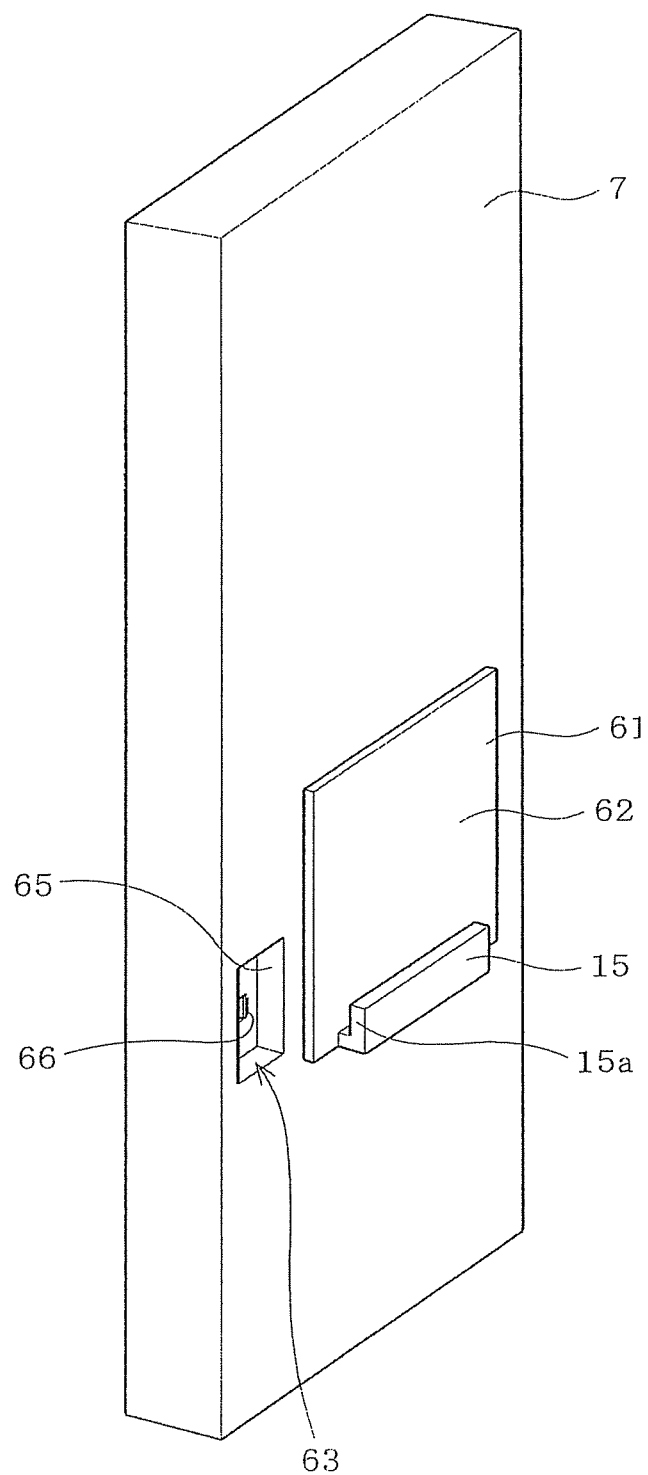
FIG. 35 is a view similar to FIG. 30, showing a seventeenth embodiment.

FIG. 35 illustrates a seventeenth embodiment. Identical or similar parts in the seventeenth embodiment are labeled by the same reference symbols as those in the fifteenth embodiment. In the seventeenth embodiment, the connecting part 63 is provided in the front of the refrigerating compartment door 7 as shown in FIG. 35. The construction of the seventeenth embodiment other than described above is the same as that of the fifteenth embodiment. Accordingly, the seventeenth embodiment can achieve substantially the same effect as the fifteenth embodiment. In particular, according to the seventeenth embodiment, since the connecting part 63 is provided in the front of the refrigerating compartment door 7, the work for connecting a terminal 64a of the connecting cable 64 to the connector 66 of the connecting part 63 can easily be carried out.

Eighteenth Embodiment

Figure 36:
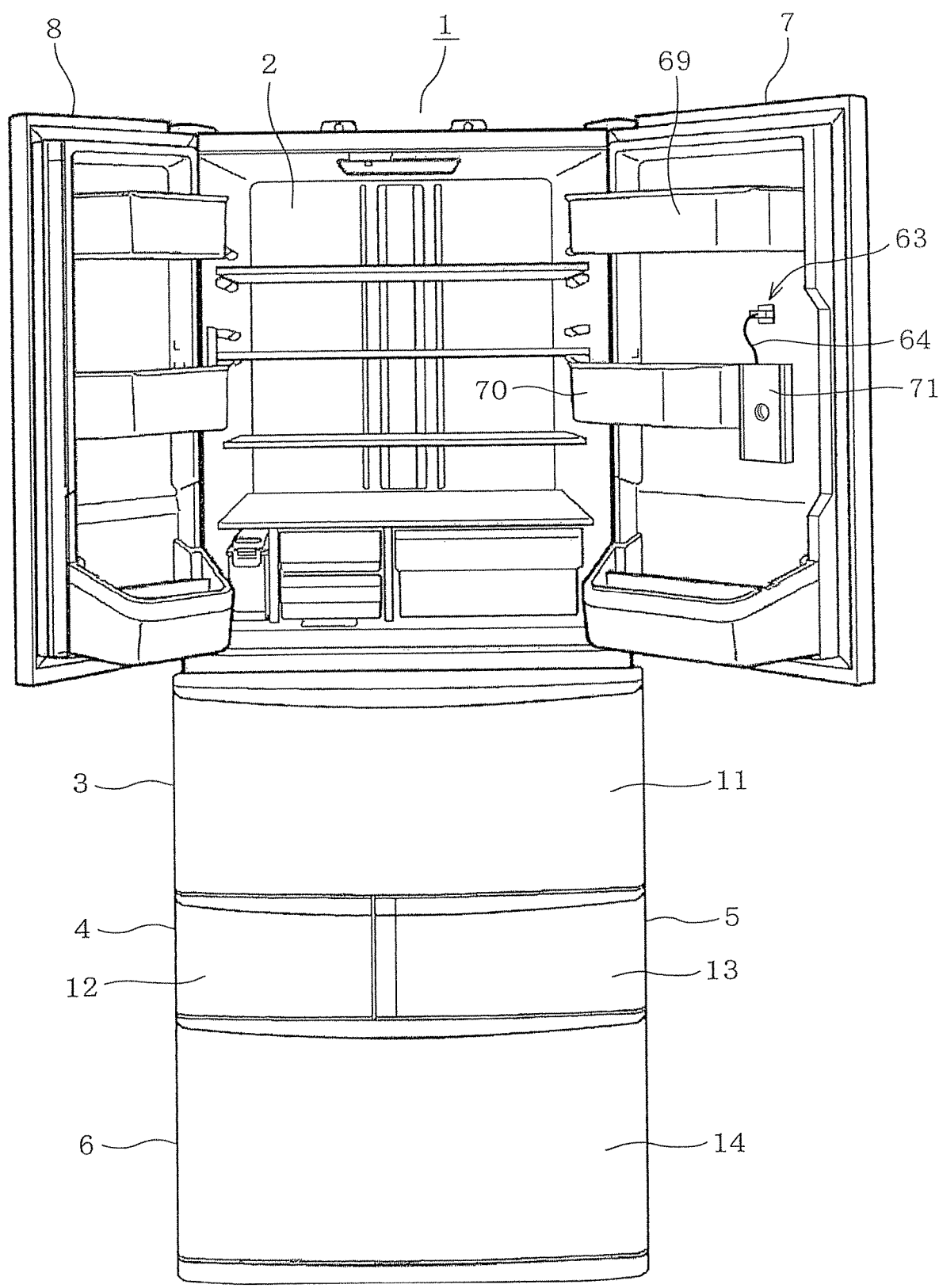
FIG. 36 is a perspective view of the refrigerator according to an eighteenth embodiment, showing the refrigerating compartment door being open.

FIG. 36 illustrates an eighteenth embodiment. Identical or similar parts in the eighteenth embodiment are labeled by the same reference symbols as those in the fifteenth embodiment. In the eighteenth embodiment, the connecting part 63 is provided at a refrigerator interior side of the refrigerating compartment door 7 as shown in FIG. 36. The inner surface of the refrigerating compartment door 7 includes a part located between an upper door pocket 69 and a middle door pocket 70. The part further includes a portion located opposite door hinges. The connecting part 63 is provided in the portion of the inner surface of the refrigerating compartment door 7. The connector 66 of the connecting part 63 and an interior camera 71 disposed in the interior of the refrigerator are connected to each other by the connecting cable 64, so that electrical power can be supplied to the interior camera 71.

The construction of the eighteenth embodiment other than described above is the same as that of the fifteenth embodiment. Accordingly, the eighteenth embodiment can achieve substantially the same effect as the fifteenth embodiment. In particular, according to the eighteenth embodiment, since the connecting part 63 is provided at the interior side of the refrigerating compartment door 7, electrical power can be supplied to the interior camera 71 disposed in the storage compartment of the refrigerator. When a wireless tag reader (not shown) or the like is disposed in the storage compartment of the refrigerator, instead of the interior camera 71, electrical power can also be supplied from the connecting part 63 to the wireless tag reader or the like.

Nineteenth Embodiment

Figure 37:
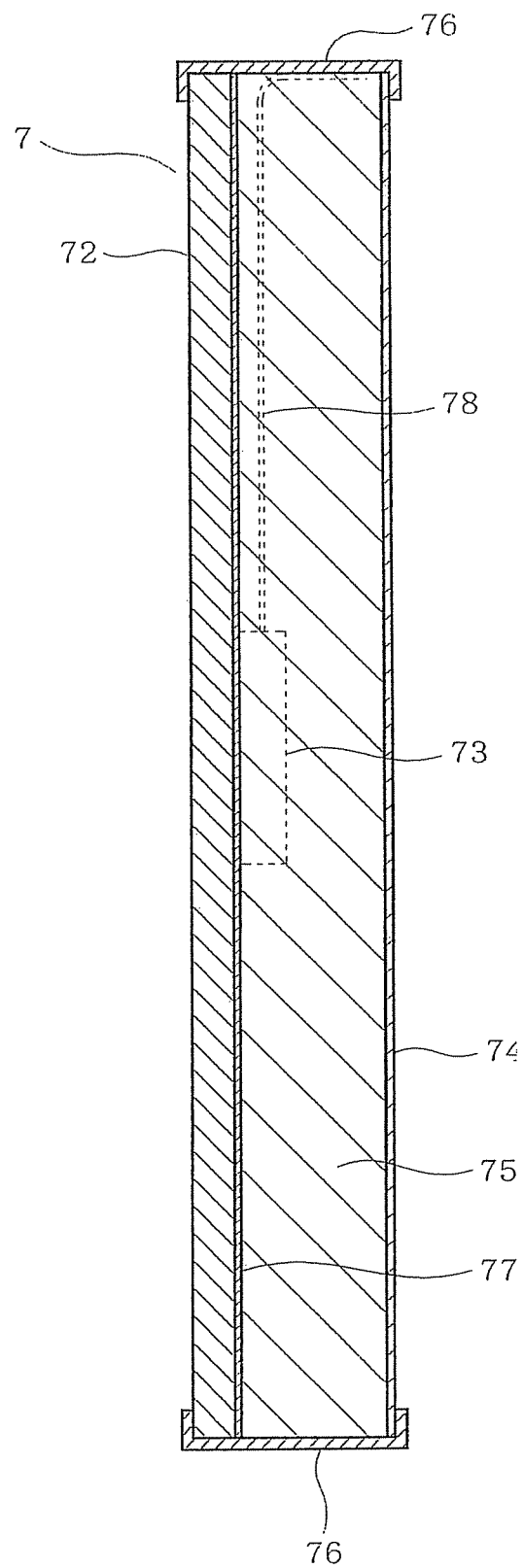
FIG. 37 is a longitudinal section of the refrigerating door in a nineteenth embodiment.
Figure 38:
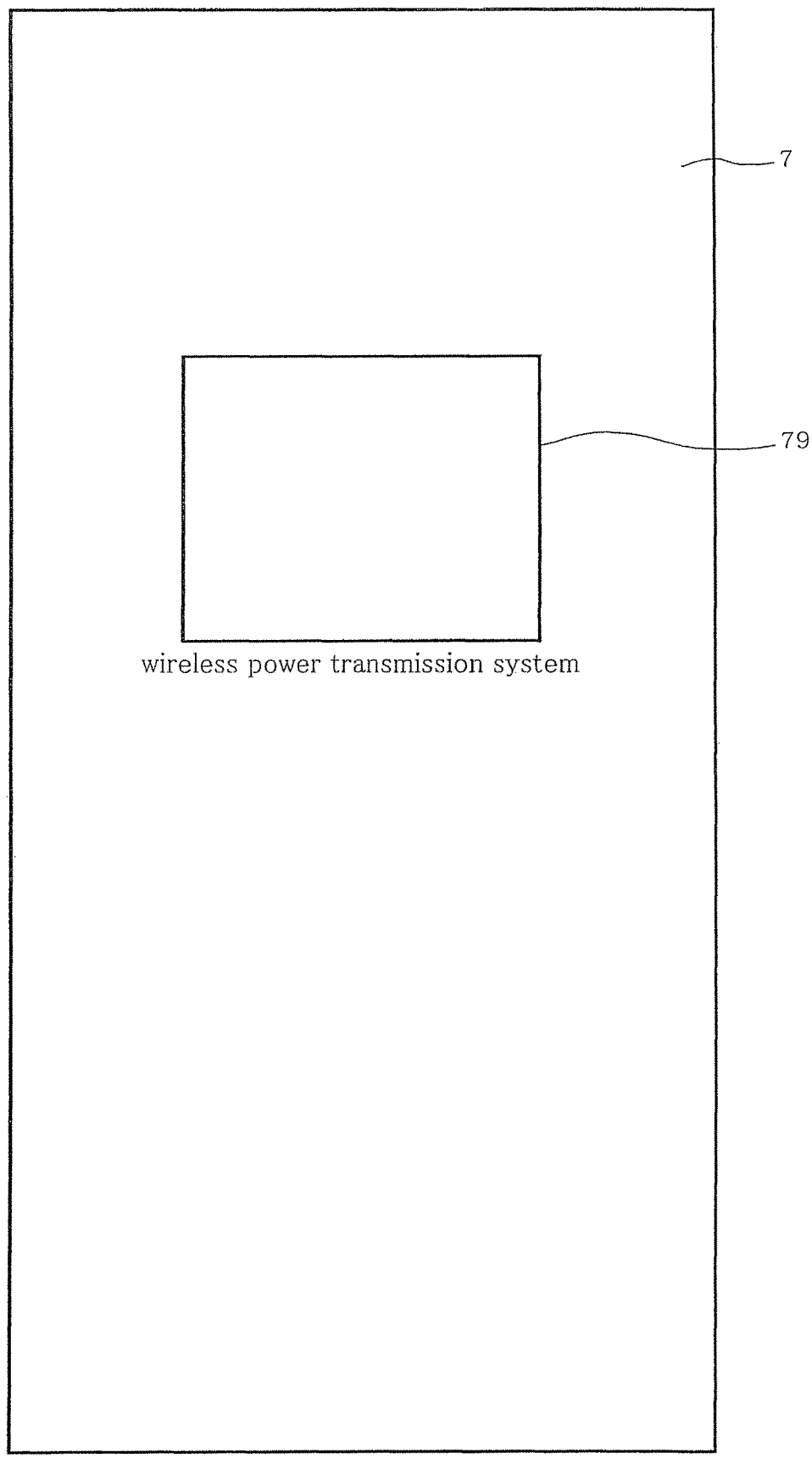
FIG. 38 is a front view of the refrigerator.
Figure 39A:
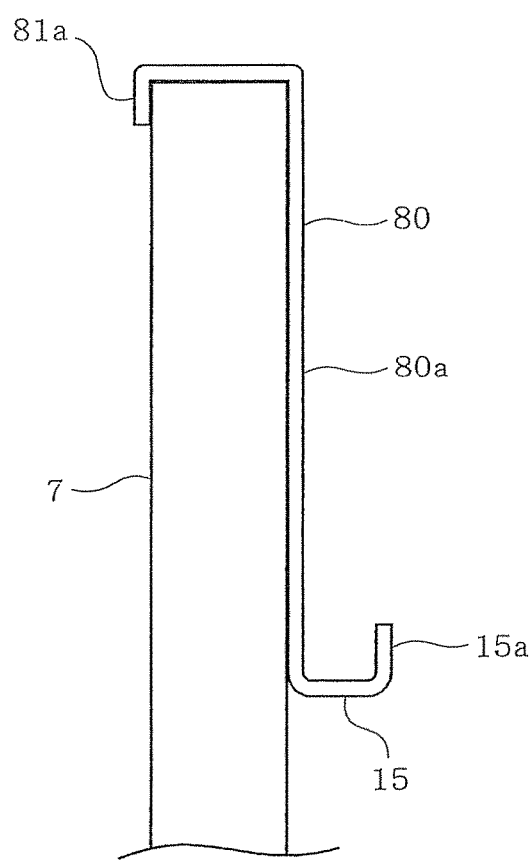
FIGS. 39A and 39B are views of a terminal holder before and after the mounting of the portable information terminal thereto respectively.
Figure 39B:
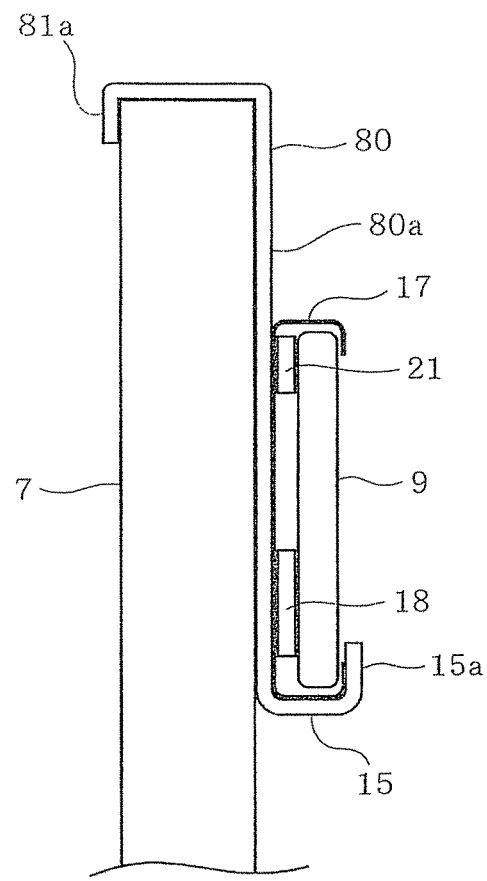

FIGS. 37 to 39 illustrate a nineteenth embodiment. Identical or similar parts in the nineteenth embodiment are labeled by the same reference symbols as those in the fifteenth embodiment. In the nineteenth embodiment, the front plate 72 of the refrigerating compartment door 7 is formed of a non-magnetic member such as glass, and a power supply part 73 of the wireless power-supply type is provided as the connecting part inside the refrigerating compartment door 7.

More specifically, the refrigerating compartment door 7 is configured of the front plate 72, an inner plate 74 made of plastic, for example, a heat insulator 75 comprising a foam insulation, for example and filling a space between the front plate 72 and the inner plate 74, and a door sash 76 made of plastic, for example. An antiscattering sheet 77 is bonded to an inner surface (a right surface as viewed in FIG. 37) of the glass front plate 72. The power supply part 73 is disposed to abut against the inner surface (a non-bonding surface) of the antiscattering sheet 77 and is buried in the heat insulator 75. As a result, the power supply part 73 is disposed inside the non-magnetic front plate 72 of the refrigerating compartment door 7. A cable (a charging power supply cable) 78 drawn out of the power supply part 73 is buried in the refrigerating compartment door 7 and is connected to a power-supply circuit (not shown) provided in the body 1 of the refrigerator.

The antiscattering sheet 77 has a bonding surface printed with, for example, a rectangular mark 79 showing the-user a position of the power supply part 7 and characters or the like indicating the wireless power supply, as shown in FIG. 38.

In attaching the portable information terminal 9 to the refrigerating compartment door 7, a terminal holder 80 as shown in FIG. 39 is used and the terminal charging cover 17 (see FIGS. 6, 7 and 8) is attached to the portable information terminal 9. The terminal holder 80 is formed of a non-magnetic material such as plastic and has an upper end with a hook 81 which is caught onto an upper end of the refrigerating compartment door 7 and a lower end with the support member 15.

In the above-described construction, the hook 81 of the terminal holder 80 is caught onto the upper part of the refrigerating compartment door 7 as shown in FIG. 39A and the lower end of the terminal charging cover 17 (the portable information terminal 9) is fitted between the front wall 15a of the support member 15 and abase plate 80a of the terminal holder 80. As a result, the portable information terminal 9 is mounted to the refrigerating compartment door 7, and the power receiving part 18 of the terminal charging cover 17 and the power supply part 73 are located opposite each other with the front plate 72 of the door 7 and the base plate 80a of the terminal holder 80 being interposed therebetween. In the mounted state of the portable information terminal 9 as described above, electrical power can be wireless-supplied to the terminal 9 via the power supply part 73 and the power receiving part 18. In this case, the power receiving part 18 of the wireless power supply type is detachably provided on the front of the refrigerating compartment door 7.

The construction of the nineteenth embodiment other than described above is the same as those of the second and fifteenth embodiments. Accordingly, the nineteenth embodiment can achieve substantially the same effect as the second and fifteenth embodiments. In particular, according to the nineteenth embodiment, since the mark 79 and the characters are printed on the front plate 72, the position of the power supply part 73 is clearly recognized, the portable information terminal 9 can be mounted to the refrigerating compartment door 7 so as to correctly correspond to the power supply part 73 with the result that the wireless power supply can reliably be carried out.

Although the terminal holder 80 is formed with the hook 81 in the foregoing embodiment, a suction disk sticking to the front plate may be provided on the base plate 80a of the terminal holder 80, instead of forming the hook 81.

Further, although the front plate 72 of the refrigerating compartment door 7 is configured of glass (the non-magnetic material) in the foregoing embodiment, only a part of the front plate corresponding to the power supply part 73 may be configured of the non-magnetic material and the other part may be configured of a magnetic material (iron, for example). When the other part of the front plate is configured of the magnetic material, a magnet sticking to the front plate may be provided on the base plate 80a of the terminal holder 80, instead of forming the hook 81 on the terminal holder 80. Further, when the other part of the front plate is configured of the magnetic material, the terminal charging cover 17 (the portable information terminal 9) may be detachably mounted on the front plate of the refrigerating compartment door 7 by causing the magnet 21 incorporated in the cover 17 to stick to the front plate, instead of use of the terminal holder 80.

Further, the portable information terminal 9 to which the terminal charging cover 17 having the wireless power supply function is housed in the terminal holder 80 in the foregoing embodiment. However, when having the wireless power supply function, the portable information terminal 9 may directly be housed in the terminal holder 80 without use of the terminal charging cover 17.

Twentieth Embodiment

Figure 40:
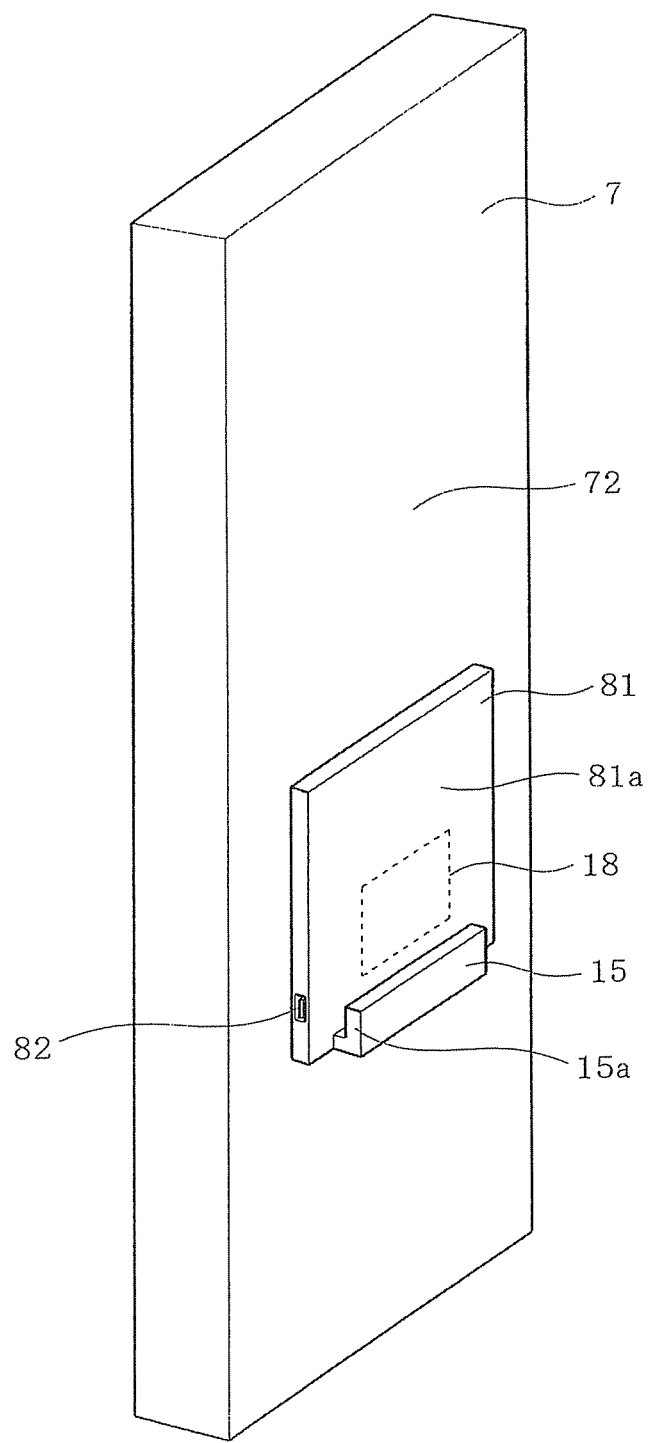
FIG. 40 is a view similar to FIG. 30, showing a twentieth embodiment.

FIG. 40 illustrates a twentieth embodiment. Identical or similar parts in the twentieth embodiment are labeled by the same reference symbols as those in the fifteenth embodiment. In the twentieth embodiment, the power receiving part in the wireless power transmission system is incorporated in the terminal holder 81 as shown in FIG. 40. A suction disk (not shown) sticking to the front plate 72 of the refrigerating compartment door 7 is provided on the rear surface of the base plate 81a of the terminal holder 81. The support member 15 is mounted on the lower end of the terminal holder 81. A receiving connecting part 82 comprising a USB connector, for example is provided on a left side of the base plate 81a of the terminal holder 81. The receiving connecting part 82 may be provided on the front of the base plate 81a of the terminal holder 81. Further, the receiving connecting part 82 may be provided on the right side, top or underside of the base plate 81a of the terminal holder 81.

In the above-described construction, the lower end of the portable information terminal 9 is fitted between the front wall 15a of the support member 15 and the base plate 81a of the terminal holder 81, so that the portable information terminal 9 is mounted on the refrigerating compartment door 7. The terminal 64 at one end of the connecting cable 64 is connected to the receiving connecting part 82 and the terminal at the other end of the connecting cable 64 is connected to the power supply connecting part of the portable information terminal 9, so that electrical power received by the power receiving part 18 of the terminal holder 81 can be supplied to the portable information terminal 9.

The construction of the twentieth embodiment other than described above is the same as those of the fifteenth embodiment. Accordingly, the twentieth embodiment can achieve substantially the same effect as the fifteenth embodiments. In particular, according to the twentieth embodiment, electrical power can be wireless-supplied from the refrigerating compartment door 7 to the portable information terminal 9 using only the terminal holder 81 without use of the terminal charging cover 17.

Although the portable information terminal 9 (the terminal holder 80 or 81) is detachably mounted on the right refrigerating compartment door 7 in the fifteenth to twentieth embodiments, the portable information terminal 9 (the terminal holder 80 or 81) may be mounted on the left refrigerating compartment door 8, instead. In this case, it is better to provide the connecting part 63 on the side or the front of the left refrigerating compartment door 8.

When the cable (the charging power-supply cable) 16a, 29, 68 or 78 buried in the refrigerating compartment door 7 or 8 is connected to the power-supply circuit (a power-supply substrate) provided in the body 1 of the refrigerator, the cable 16a, 29, 68 or 78 is configured to be inserted through a cylindrical door hinge. This can reduce stress applied to the cable 16a, 29, 68 or 78 in the opening or closing of the refrigerating compartment door 7 or 8.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

The invention claimed is:

1. A refrigerator comprising:
a storage compartment;
a door configured to open and close a front opening of the storage compartment, the door being rotatable in a lateral direction;
a terminal mounting part formed entirely in a recess in a front surface of the door and configured to detachably mount a portable information terminal;
a terminal power supply part configured to supply power to the portable information terminal when the portable information terminal is mounted on the terminal mounting part; and
a buffer provided on both sides of an opening peripheral edge of the recess in a width direction of the door, wherein the buffer abuts on both sides of an inner peripheral wall surface of the recess in the width direction of the door without contacting a rear surface of the recess along an entire length of the buffer, and wherein the portable information terminal is housed in the recess with the buffer between the portable information terminal and the door when the portable information terminal is mounted on the terminal mounting part.

2. The refrigerator according to claim 1, wherein the terminal power supply part comprises a dock connector.

3. The refrigerator according to claim 1, wherein the terminal power supply part comprises a USB connector.

4. The refrigerator according to claim 1, wherein the terminal power supply part is configured of a wireless power supply device.

5. The refrigerator according to claim 4, wherein the wireless power supply device is configured to wireless-supply power on an electromagnetic induction basis.

6. The refrigerator according to claim 4, wherein the wireless power supply device is configured to wireless-supply power on a capacitive coupling basis.

7. The refrigerator according to claim 4, further comprising a wireless power-supply cover attached to the portable information terminal and having a connecting terminal connected to a charging terminal of the portable information terminal, the wireless power-supply cover inputting electrical power wireless-supplied from the wireless power-supply device thereby to output the electrical power to the portable information terminal.

8. The refrigerator according to claim 7, wherein the wireless power-supply cover is provided with a magnet sticking to a front plate of the door.

9. The refrigerator according to claim 8, wherein when the front plate of the door is made of a non-magnetic material, a plate member made of a magnetic material or the magnet is provided on an inside of the front plate.

10. The refrigerator according to claim 1, further comprising a relay cable connecting a charging power-supply cable drawn out of an interior of the door to the charging terminal of the portable information terminal.

11. The refrigerator according to claim 1, wherein the terminal mounting part includes a fitting support part in which a lower end of the portable information terminal is fitted so that the portable information terminal is supported.

12. The refrigerator according to claim 11, wherein the fitting support part is movable.

13. The refrigerator according to claim 12, wherein the fitting support part is provided with a magnet sticking to a front plate of the door.

14. The refrigerator according to claim 13, wherein the magnet of the fitting support part has a strong magnetic force.

15. The refrigerator according to claim 11, wherein the fitting support part is detachable from the door and is usable as a stand for the portable information terminal when detached.

16. The refrigerator according to claim 1, further comprising a heat insulator provided in a first part of an inside of the door in which the recess is formed and a periphery of the first part,
wherein the inside of the door includes a second part in which a second heat insulator is provided, and
wherein the heat insulator has a higher heat insulation performance than a heat insulation performance of the second heat insulator.

17. The refrigerator according to claim 1, wherein the recess in the front surface of the door includes an upper part comprising a pressing member configured to press an upper end of the portable information terminal.

18. The refrigerator according to claim 1, wherein the recess is formed so that one side thereof is open at one side of the door, and the portable information terminal is put into and taken out through the side opening.

19. The refrigerator according to claim 18, wherein the recess includes an upper interior and a lower interior both of which are provided with rail members guiding the portable information terminal put into and taken out of the recess, respectively.

20. The refrigerator according to claim 18, wherein when the door is of a biparting type, the side opening is provided in an outwardly located side of the door.

21. The refrigerator according to claim 1, wherein the terminal mounting part is configured so that the portable information terminal is mounted while being inclined.

22. The refrigerator according to claim 21, wherein the terminal mounting part is configured so that an inclination angle of the portable information terminal is adjustable.

23. The refrigerator according to claim 1, wherein the front of the door comprises one or more eaves located on a top of the terminal mounting part.

24. The refrigerator according to claim 1, wherein a cover covering a front of the terminal mounting part is provided to be slidable.

25. The refrigerator according to claim 1, wherein the terminal mounting part is provided on a top door.

26. The refrigerator according to claim 1, wherein the terminal power-supply part is disposed on an upper part of the terminal mounting part and is directed downward.

27. The refrigerator according to claim 26, wherein the terminal mounting part is provided to be recessed in the front of the door.

28. The refrigerator according to claim 27, wherein when the portable information terminal is housed in the recessed terminal mounting part, a screen of the portable information terminal in a standby mode is configured to display an image having a color identical with one of the front of the door or a design identical with one of the front of the door.

29. The refrigerator according to claim 1, wherein the door is a biparting type comprising a first door having a first width and a second door having a second width smaller than the first width, and the terminal mounting part is provided in the second door.

30. The refrigerator according to claim 1, further comprising a waterproof structure provided around the terminal power-supply part in the terminal mounting part.

31. The refrigerator according to claim 1, wherein the terminal mounting part is provided with a terminal detaching mechanism configured to detach the portable information terminal from the terminal mounting part.

32. The refrigerator according to claim 31, wherein the terminal detaching mechanism has a recess shape and is provided on a peripheral edge of the terminal mounting part.

33. The refrigerator according to claim 1, further comprising a power supply unit configured to supply to the portable information terminal a constant voltage power supply generated based on an AC power supplied from a power-supply outlet.

34. The refrigerator according to claim 33, wherein the power supply unit is provided on the door and includes a connecting part connected through a connecting cable to the portable information terminal.

35. The refrigerator according to claim 34, wherein the connecting part includes a recess provided in the door and a connector provided in the recess.

36. The refrigerator according to claim 35, wherein the recess has an interior configured to be capable of housing the connecting cable.

37. The refrigerator according to claim 35, wherein the connecting part includes a cover closing an opening of the recess.

38. The refrigerator according to claim 34, wherein the connecting part is provided in a side of the door.

39. The refrigerator according to claim 34, wherein the connecting part is provided in a side of the door located at an interior side of the refrigerator.

40. The refrigerator according to claim 33, wherein the door includes a front plate formed of a non-magnetic material, and the connecting part is a power-supply part of a wireless power-supply system.

41. The refrigerator according to claim 40, wherein the power-supply part is provided on an inside of the front plate of the door, the front plate comprising a non-magnetic member.

42. The refrigerator according to claim 41, wherein the front plate of the door is provided with a mark showing a user a position of the power-supply part.

43. The refrigerator according to claim 40, wherein a power receiving part of the wireless power-supply system is provided on the front of the door.

44. The refrigerator according to claim 43, wherein the power receiving part is configured to supply the received power to the portable information terminal and includes a power receiving part connecting part connected through a connecting cable to the portable information terminal.

45. The refrigerator according to claim 34, wherein the portable information terminal is detachably mounted via a terminal holder to the door.

46. The refrigerator according to claim 40, wherein the portable information terminal is detachably mounted via a terminal holder to the door.

\* \* \* \* \*